United States Patent
Park

(10) Patent No.: US 11,688,195 B2
(45) Date of Patent: Jun. 27, 2023

(54) ELECTRONIC DEVICE AND METHOD FOR ASSISTING WITH DRIVING OF VEHICLE

(71) Applicant: SAMSUNG ELECTRONICS CO., LTD., Suwon-si (KR)

(72) Inventor: Yosub Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 15/931,249

(22) Filed: May 13, 2020

(65) Prior Publication Data
US 2020/0364471 A1 Nov. 19, 2020

(30) Foreign Application Priority Data
May 14, 2019 (KR) .................. 10-2019-0056554

(51) Int. Cl.
*G06K 9/62* (2022.01)
*G06T 7/00* (2017.01)
(Continued)

(52) U.S. Cl.
CPC .......... *G06V 40/10* (2022.01); *G06F 18/2113* (2023.01); *G06F 18/22* (2023.01);
(Continued)

(58) Field of Classification Search
CPC .......... G06V 20/58; G06N 20/00; G06N 3/08; G06K 9/6215; G06K 9/623; G06T 7/0002;
(Continued)

(56) References Cited

U.S. PATENT DOCUMENTS

| 11,256,926 B2 * | 2/2022 | Nicholson ............ G08G 1/0116 |
| 2017/0200063 A1 | 7/2017 | Nariyambut Murali et al. |

(Continued)

FOREIGN PATENT DOCUMENTS

| KR | 10-2016-0140303 A | 12/2016 |
| KR | 10-2018-0055708 A | 5/2018 |

(Continued)

OTHER PUBLICATIONS

Wu, "Accurate Vehicle Detection Using Multi-Camera Data Fusion and Machine Learning" (Year: 2018).*

(Continued)

*Primary Examiner* — Kenny A Cese
(74) *Attorney, Agent, or Firm* — Sughrue Mion, PLLC

(57) ABSTRACT

An electronic device may include a processor configured to: obtain a plurality of images, the plurality of images including a first image captured by a first camera or image sensor, and a second image captured by a second camera or image sensor. The processor may further be configured to: determine whether a first object and a second object respectively included in the first image and the second image are a same object, and based on determining that the first object and the second object are the same object, train a neural network data recognition model to recognize the first object and the second object as the same object in both the first image and the second image by using the first image and the second image as training data of the neural network data recognition model.

18 Claims, 14 Drawing Sheets

(51) Int. Cl.

| | |
|---|---|
| *G06N 20/00* | (2019.01) |
| *H04N 5/232* | (2006.01) |
| *G06N 3/08* | (2006.01) |
| *G06V 40/10* | (2022.01) |
| *G06V 20/58* | (2022.01) |
| *G06F 18/22* | (2023.01) |
| *G06F 18/2113* | (2023.01) |
| *H04N 23/661* | (2023.01) |
| *G06V 10/74* | (2022.01) |
| *G06V 10/764* | (2022.01) |
| *G06V 10/82* | (2022.01) |

(52) U.S. Cl.
CPC .............. *G06N 3/08* (2013.01); *G06N 20/00* (2019.01); *G06T 7/0002* (2013.01); *G06V 10/761* (2022.01); *G06V 10/764* (2022.01); *G06V 10/82* (2022.01); *G06V 20/58* (2022.01); *H04N 23/661* (2023.01); *G06T 2207/20081* (2013.01); *G06T 2207/20084* (2013.01); *G06T 2207/30261* (2013.01)

(58) Field of Classification Search
CPC . G06T 2207/20081; G06T 2207/20084; G06T 2207/30261; H04N 5/23206
See application file for complete search history.

(56) References Cited

U.S. PATENT DOCUMENTS

| | | | | |
|---|---|---|---|---|
| 2017/0206437 | A1* | 7/2017 | Hachiya | ............. G06V 10/7747 |
| 2018/0107215 | A1 | 4/2018 | Djuric et al. | |
| 2019/0228266 | A1* | 7/2019 | Habibian | ............. G06N 3/0445 |
| 2020/0012868 | A1 | 1/2020 | Hong et al. | |
| 2020/0025877 | A1* | 1/2020 | Sarkis | ...................... G01S 7/412 |

FOREIGN PATENT DOCUMENTS

| | | |
|---|---|---|
| KR | 10-2018-0058624 A | 6/2018 |
| KR | 10-2018-0110891 A | 10/2018 |

OTHER PUBLICATIONS

Copeland, Michael, "What's the Difference Between Deep Learning Training and Inference?", NVIDIA, Aug. 22, 2016, https://blogs.nvidia.com/blog/2016/08/22/difference-deep-learning-training-inference-ai/. (6 pages total).

Eliot, L., "Federated Machine Learning for AI Self-Driving Cars", AI Trends, May 18, 2018, https://aitrends.com/ai-insider/federated-machine-learning-for-ai-self-driving-cars/. (10 pages total).

Rodriguez, Jesus, "What's New in Deep Learning Research: Understanding Federated Learning", Feb. 26, 2018, https://towardsdatascience.com/whats-new-in-deep-learning-research-understanding-federated-learning-b14e7c3c6f89. (4 pages total).

McMahan, Brendan et al., "Federated Learning: Collaborative Machine Learning without Centralized Training Data", Google AI Blog, Apr. 6, 2017, https://ai.googleblog.com/2017/04/federated-learning-collaborative.html. (5 pages total).

Eliot, Lance B., Dr., "Framework for AI Driverless Cars: The Big Picture" AI Trends, Oct. 24, 2017, https://aitrends.com/selfdrivingcars/framework-ai-self-driving-driverless-cars-big-picture. (10 pages total).

Daniel, What's the Difference Between Machine Learning Traing and Inference?, Paperspace Community, Nov. 2017, https://community.paperspace.com/t/what-s-the-difference-between-machine-learning-training-and-inference/102. (3 pages total).

Wong, William G., "What's the Difference Between Machine Learning Techniques?", Electronic Design, Apr. 27, 2017, https://www.electronicdesign.com/automotive/what-s-difference-between-machine-learning-techniques. (12 pages total).

Hwang, Michael, "Discover the Difference Between Deep Learning Training and Inference", EXXACT, Aug. 10, 2017, http://blog.exxactcorp.com/discover-difference-deep-learning-training-inference/. (7 pages total).

Wang, Yanchen, "Deep Learning in Real Time-Inference Acceleration and Continuous Training", Medium, Aug. 20, 2017, https://medium.com/syncedreview/deep-learning-in-real-time-inference-acceleration-and-continuous-training-17dac9438b0b. (16 pages total).

Whitepaper, "GPU-Based Deep Learning Inference: A Performance and Power Analysis", NVIDA, Nov. 2015. (12 pages toal).

Bredereck, Michael et al., "Data Association for Multi-Object Tracking-by-Detection in Multi-Camera Networks", Published in 2012 Sixth International Conference on Distributed Smart Cameras (ICDSC), Oct. 30, 2012-Nov. 2, 2012, IEEE, Feb. 25, 2013. (7 pages toal).

International Search Report and Written Opinion (PCT/ISA/220, PCT/ISA/210, and PCT/ISA/237) dated Aug. 18, 2020 issued by the International Searching Authority in International Application No. PCT/KR2020/006237.

Communication dated May 19, 2022 by the European Patent Office for European Patent Application No. 20805199.5.

Wu, H., "Accurate Vehicle Detection Using Multi-Camera Data Fusion and Machine Learning", Dec. 15, 2018, Southern Methodist University, Electrical Engineering Theses and Dissertations, XP055918099, 41 pages total.

\* cited by examiner

|  | object1 | object2 | object3 |
|---|---|---|---|
| object1 | 1 | 0.8 | 0.9 |
| object2 | 0.8 | 1 | 0.8 |
| object3 | 0.9 | 0.8 | 1 |

ELECTRONIC DEVICE AND METHOD FOR ASSISTING WITH DRIVING OF VEHICLE

CROSS-REFERENCE TO RELATED APPLICATION

This application is based on and claims priority under 35 U.S.C. § 119 to Korean Patent Application No. 10-2019-0056554, filed on May 14, 2019, in the Korean Intellectual Property Office, the disclosure of which is incorporated by reference herein in its entirety.

BACKGROUND

1. Field

The disclosure relates to an electronic device and an operating method of the electronic device, and more particularly, to an electronic device and a method for detecting objects in real time, such as, to assist with driving of a vehicle.

2. Description of Related Art

Due to the convergence of information and communication technologies with the automotive industry, automobile smartization is rapidly progressing. Due to smartization, automobiles are evolving from simple mechanical devices to smart cars, and autonomous driving is drawing attention as a key technology of smart cars.

Fully autonomous driving is a technology in which a vehicle travels (e.g., to its destination) without the driver manipulating the steering wheel, accelerator pedal, or brakes. Semi-autonomous driving may involve some driver manipulation.

Recently, various additional functions related to autonomous driving have been continuously developed, and research on a method for providing a safe autonomous driving experience to occupants by controlling a car by recognizing and determining a driving environment using various data is required.

Also, an artificial intelligence (AI) system is a computer system with human like intelligence, and unlike a previous rule-based smart system, the AI system may be a system that trains itself, makes decisions, and becomes increasingly smarter. The more the AI system is used, the higher the recognition rate of the AI system and the AI system may more accurately understand a user's tastes. Thus, the previous rule-based smart system has been gradually replaced by AI, such as, by a deep learning-based AI system.

AI technologies are composed of machine learning (for example, deep learning) and human element technologies using the machine learning.

Machine learning is an algorithm technology that classifies/learns characteristics of input data on its own. Human element technology is a technology that simulates functions of the human brain, such as recognition, determination, etc., by using machine learning algorithms, such as deep learning, etc., and includes technical fields of linguistic understanding, visual comprehension, inference/prediction, knowledge representation, operation control, etc.

AI technology may be applied to various fields as follows. Linguistic understanding is a technology to recognize and apply/process human language/characters and includes processing of natural language, machine translation, a conversation system, a query response, speech recognition/synthesis, etc. Visual comprehension is a technology to recognize and process objects as in human vision and includes object recognition, object detection, image search, human recognition, scene understanding, spatial understanding, image enhancement, etc. Inference prediction is a technology to examine and logically infer and predict information and includes inference based on knowledge/probabilities, optimization prediction, preference-based planning, recommendation, etc. Knowledge representation is a technology to automatically process human experience data into knowledge data and includes knowledge establishment (data generation/classification), knowledge management (data usage), etc. Operation control is a technology to control autonomous driving of a vehicle and motions of a robot and includes motion control (navigation, collision avoidance, driving), manipulation control (behavior control), etc.

SUMMARY

Provided are an electronic device and a method for assisting with driving of a vehicle. Also, provided is a non-transitory computer-readable recording medium having recorded thereon a program for executing the method on a computer. The technical problem to be solved is not limited to the technical problem as described above, and there may be another technical problem.

Additional aspects will be set forth in part in the description which follows and, in part, will be apparent from the description, or may be learned by practice of the presented embodiments of the disclosure.

In accordance with an aspect of the disclosure, an electronic device for assisting with driving of a plurality of vehicles includes: a communication interface, a memory storing one or more instructions, and a processor configured to execute the one or more instructions stored in the memory to: receive a plurality of images captured by the plurality of vehicles and a plurality of pieces of capturing information corresponding to the plurality of images, from the plurality of vehicles, through the communication interface; determine whether or not a first object and a second object respectively included in a first image and a second image from among the plurality of images are a same object, wherein the first object and the second object are determined to be located at a same location at a same time point based on a first piece of capturing information and a second piece of capturing information respectively corresponding to the first image and the second image; and modify and refine a data recognition model by using the first image and the second image as training data of the data recognition model, which is trained to recognize an object from an image, when it is determined that the first object and the second object are the same object.

In accordance with an aspect of the disclosure, a method of assisting with driving of a plurality of vehicles includes: receiving a plurality of images captured by the plurality of vehicles and a plurality of pieces of capturing information corresponding to the plurality of images, from the plurality of vehicles, through a communication interface; determining whether or not a first object and a second object respectively included in a first image and a second image from among the plurality of images are a same object, wherein the first object and the second object are determined to be located at a same location at a same time point based on a first piece of capturing information and a second piece of capturing information respectively corresponding to the first image and the second image; and modifying and refining a data recognition model by using the first image and the second image as training data of the data recognition model, which is trained to recognize an object from an image, when it is determined that the first object and the second object are the same object.

In accordance with an aspect of the disclosure, a computer-readable recording medium has recorded thereon a program for executing the method described above on a computer.

In accordance with an aspect of the disclosure, an electronic device may comprise a communication interface, a memory, and a processor.

In accordance with an aspect of the disclosure, the processor may be configured to execute the one or more instructions stored in the memory to: obtain a plurality of images of a real world scene, through the communication interface, the plurality of images including a first image captured by a first camera or image sensor, and a second image captured by a second camera or image sensor; determine whether a first object included in the first image and a second object included in the second image are a same object, wherein the first object and the second object are determined to be the same object based on a similarity between the first object and the second object; and based on a first piece of capturing time and location information and a second piece of capturing time and location information respectively corresponding to the first image and the second image corresponding to a same location at a same time point, and wherein the first piece of capturing time and location information and the second piece of capturing time and location information include information about a time point and information about a location at which the first image and the second image is captured, respectively; and based on determining that the first object and the second object are the same object, train a neural network data recognition model to recognize the first object and the second object as the same object in both the first image and the second image by using the first image and the second image as training data of the neural network data recognition model.

In accordance with an aspect of the disclosure, the processor may further configured to execute the one or more instructions to, based on determining that the first object and the second object are not the same object, exclude the first image or the second image from the training data based on a recognition rate of the first image or the second image being less than a predefined threshold recognition rate, and train the neural network data recognition model to recognize the object based on the training data.

In accordance with an aspect of the disclosure, the processor may be further configured to execute the one or more instructions to, obtain the first piece of capturing time and location information and the second piece of capturing time and location information respectively corresponding to the first image and the second image, through the communication interface.

In accordance with an aspect of the disclosure, the processor may be further configured to execute the one or more instructions to: determine the similarity between the first object and the second object by: calculating a similarity value by matching the first object with the second object, and determining that the first object and the second object are the same object, when the similarity value is determined to be equal to or higher than a pre-set threshold value, and the first image and the second image are located in the same location at the same time point.

In accordance with an aspect of the disclosure, the processor may be further configured to execute the one or more instructions to: recognize an object from the plurality of images by using the neural network data recognition model; select an image, for which a recognition rate of the object is calculated to be equal to or lower than a pre-set threshold value, from among the plurality of images; and determine whether to use the selected image as the training data of the neural network data recognition model.

In accordance with an aspect of the disclosure, the processor may be further configured to execute the one or more instructions to: receive information about a recognition rate at which an object is recognized in each of the plurality of images using the neural network data recognition model, from a plurality of vehicles, through the communication interface; select an image, for which the recognition rate is calculated to be equal to or lower than a pre-set threshold value, from among the plurality of images, and determine whether or not to use the selected image as the training data of the neural network data recognition model.

In accordance with an aspect of the disclosure, the processor may be configured to further configured to execute the one or more instructions to transmit the trained neural network data recognition model to a plurality of vehicles through the communication interface, the plurality of vehicles including a first vehicle in which the first camera or image sensor is mounted, and a second vehicle in which the second camera or image sensor is mounted.

In accordance with an aspect of the disclosure, a method may comprise: obtaining a plurality of images of a real world scene, through a communication interface, the plurality of images including a first image captured by a first camera or image sensor, and a second image captured by a second camera or image sensor; determining whether or not a first object and a second object respectively included in the first image and the second image are a same object, wherein the first object and the second object are determined to be the same object based on a similarity between the first object and the second object and based on a first piece of capturing time and location information and a second piece of capturing time and location information respectively corresponding to the first image and the second image corresponding to a same location at a same time point, wherein the first piece of capturing time and location information and the second piece of capturing time and location information include information about a time point and information about a location at which the first image and the second image is captured, respectively; and based on determining that the first object and the second object are the same object, training a neural network data recognition model to recognize the first object and the second object as the same object in both the first image and the second image by using the first image and the second image as training data of the neural network data recognition model.

In accordance with an aspect of the disclosure, the method may further comprise: based on determining that the first object and the second object are not the same object, excluding the first image or the second image from the training data based on a recognition rate of the first image or the second image being less than a predefined threshold recognition rate, and training the neural network data recognition model to recognize the object in based on the training data.

In accordance with an aspect of the disclosure, the method may further comprise: obtaining the first piece of capturing time and location information and the second piece of capturing time and location information respectively corresponding to the first image and the second image, through the communication interface.

In accordance with an aspect of the disclosure, the determining of the similarity between the first object and the second object may further comprise: calculating a similarity value by matching the first object with the second object; and determining that the first object and the second object are the same object, when the similarity is determined to be equal to or higher than a pre-set threshold value and the first image and the second image are located in the same location at the same time point.

In accordance with an aspect of the disclosure, the method may further comprise: recognizing an object from the plurality of images by using the neural network data recognition model; selecting an image, for which a recognition rate of the object is calculated to be equal to or lower than a pre-set threshold value, from among the plurality of images; and determining whether or not to use the selected image as the training data of the neural network data recognition model.

In accordance with an aspect of the disclosure, the method may further comprise: receiving information about a recognition rate at which an object is recognized from each of the plurality of images using the neural network data recognition model, from a plurality of vehicles, through the communication interface; selecting an image, for which the recognition rate is calculated to be equal to or lower than a pre-set threshold value, from among the plurality of images; and determining whether or not to use the selected image as the training data of the neural network data recognition model.

In accordance with an aspect of the disclosure, the method may further comprise: transmitting the trained neural network data recognition model to a plurality of vehicles through the communication interface, the plurality of vehicles including a first vehicle in which the first camera or image sensor is mounted, and a second vehicle in which the second camera or image sensor is mounted.

In accordance with an aspect of the disclosure, a non-transitory computer-readable recording medium may have recorded thereon a program for executing a method that comprises: obtaining a plurality of images of a real world scene, through a communication interface, the plurality of images including a first image captured by a first camera or image sensor, and a second image captured by a second camera or image sensor; determining whether or not a first object and a second object respectively included in the first image and the second image are a same object, wherein the first object and the second object are determined to be the same object based on a similarity between the first object and the second object and based on a first piece of capturing time and location information and a second piece of capturing time and location information respectively corresponding to the first image and the second image corresponding to a same location at a same time point, wherein the first piece of capturing time and location information and the second piece of capturing time and location information include information about a time point and information about a location at which the first image and the second image is captured, respectively; and based on determining that the first object and the second object are the same object, training a neural network data recognition model to recognize the first object and the second object as the same object in both the first image and the second image by using the first image and the second image as training data of the neural network data recognition model.

In accordance with an aspect of the disclosure, a computer-implemented method of training a neural network for object detection may comprise: collecting a set of digital sample images from a database; inputting the collected set of digital sample images into a neural network recognition model; and training the neural network recognition model to recognize a first object in a first digital image as a specific object based on the first object being similar to a second object in a second digital image that is co-located with the first object at a same time point.

In accordance with an aspect of the disclosure, the method may further comprise: detecting objects in the collected set of digital sample images, and analyzing the detected objects; and determining that the first object and the second object are similar to each other when one or more appearance attributes of the first object in the first digital image is the same as one or more appearance attributes of the second object in the second digital image.

In accordance with an aspect of the disclosure, the first digital image may have a recognition rate for the specific object using the neural network recognition model that is lower than a predefined recognition rate threshold for the specific object using the neural network recognition model, and the second digital image may have a recognition rate for the specific object using the neural network recognition model that is greater than the predefined recognition rate threshold.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the disclosure, when a part "includes" an element, it is to be understood that the part additionally includes other elements rather than excluding other elements as long as there is no particular opposing recitation. Also, the terms described in the disclosure, such as "unit," "module," etc., may denote a unit processing at least one function or operation, which may be implemented as hardware (e.g., a hardware processor) or software or a combination thereof.

Hereinafter, embodiments will now be described more fully with reference to the accompanying drawings for one of ordinary skill in the art to be able to perform the disclosure without any difficulty. The disclosure may, however, be embodied in many different forms and should not be construed as being limited to the embodiments set forth herein.

Throughout the disclosure, the expression "at least one of a, b or c" indicates only a, only b, only c, both a and b, both a and c, both b and c, all of a, b, and c, or variations thereof.

Hereinafter, embodiments will be described in detail with reference to the drawings.

Figure 1:
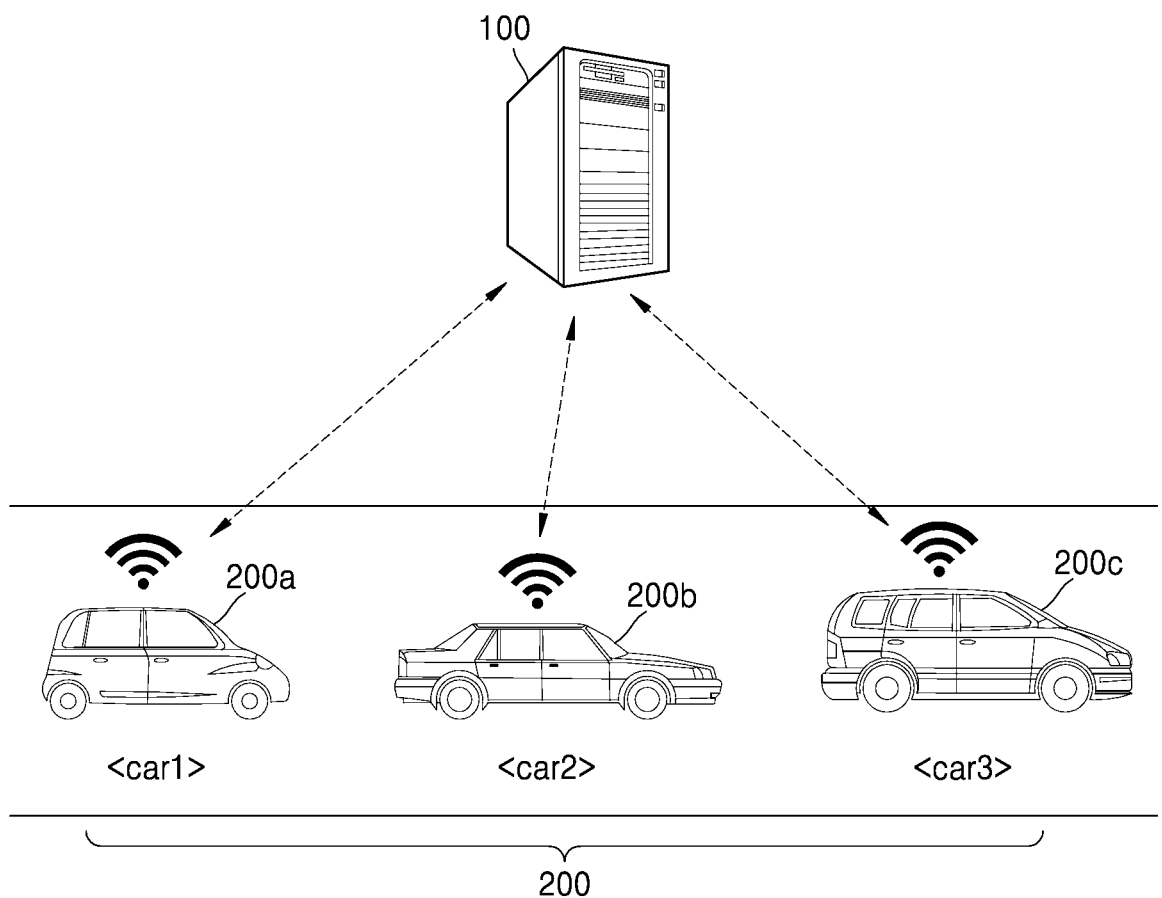
FIG. 1 is a schematic view for describing an example of an operation of an electronic device for assisting with driving of a vehicle, according to an embodiment.

FIG. 1 is a schematic view for describing an example of an operation of an electronic device 100 for assisting with driving of a vehicle, according to an embodiment.

According to an embodiment, the electronic device 100 may operate as a server for assisting with or controlling a driving operation of a vehicle.

According to an embodiment, first through third vehicles 200a, 200b, and 200c may be autonomous vehicles or may autonomously control part of a driving operation. For example, the first through third vehicles 200a, 200b, and 200c may be realized to perform a function of an autonomous driving system or an advanced driver assistance system (ADAS). The autonomous vehicles or the vehicles capable of autonomously controlling at least a function may use various sensors while driving to recognize objects around the vehicles, and thus, may provide a stable driving environment.

An object according to an embodiment may denote an object included in an image obtained by capturing a surrounding environment (a front side, a rear side, a lateral side, etc.) of a vehicle 200. Also, the object may denote an object detected in a surrounding environment (a front side, a rear side, a lateral side, etc.) of the vehicle 200 while the vehicle 200 is driving. For example, the object that may be detected may include other vehicle(s), a pedestrian, an obstacle on a driving path, etc., but is not limited thereto.

Referring to FIG. 1, the first through third vehicles 200a, 200b, and 200c may perform relatively more accurate and stable autonomous driving operations through data exchange with the electronic device 100.

The vehicle 200 according to an embodiment may correspond to at least one processor and at least one memory that are located in or mounted to the vehicle 200. The vehicle 200 according to an embodiment may capture a surrounding environment of the vehicle 200 by using an image sensor 228 (FIG. 17) and may recognize an object (for example, a pedestrian on the road, a vehicle, a road sign, etc.) from an image obtained by capturing the surrounding environment.

The image sensor 228 (FIG. 17) may include a still camera or a video camera configured to record an external environment of a vehicle. For example, the image sensor 228 may include a plurality of cameras and the plurality of cameras may be arranged in a plurality of locations inside and outside of the vehicle 200.

According to an embodiment, the vehicle 200 may capture the surrounding environment by using the image sensor 228 (FIG. 17) and use a deep learning-based trained data recognition model to recognize the object from a plurality of image frames obtained by capturing the surrounding environment of the vehicle 200.

According to an embodiment, the vehicle 200 may extract a candidate area in the image frame to recognize the object from the image frame and may estimate a type and a location of the object from the extracted candidate area by using the trained data recognition model.

The data recognition model may be, for example, a model based on a neural network. For example, a convolutional neural network (CNN), a deep neural network (DNN), a recurrent neural network (RNN), a bidirectional recurrent deep neural network (BRDNN), etc. may be used as the data recognition model, but it is not limited thereto.

For example, the vehicle 200 may recognize the object (for example, a pedestrian on the road, a vehicle, a road sign, etc.) included in the image frame by using the data recognition model based on the CNN including a plurality of layers. Each layer may receive data and process the received data to generate data that is output from each layer.

According to an embodiment, the vehicle 200 may perform object recognition via a graphics processing unit (GPU). That is, according to an embodiment, the at least one processor of the vehicle, which may be a general processor, may perform control so that object recognition is performed by using the GPU, which may be a more powerful processor than the general processor. However, the vehicle is not limited in this respect. In an embodiment, the GPU may be used to perform the functions of the general processor. In an embodiment, the general processor may perform the object recognition. Also, the vehicle 200 may perform object recognition via an exclusive hardware chip for artificial intelligence (AI), but it is not limited thereto.

FIGS. 13-19 show a processor 1300, which may correspond to the GPU. However, the processor 1300 is not limited to being the GPU and may be used as other processors. Processor 1300 may be a hardware processor.

Figure 13:
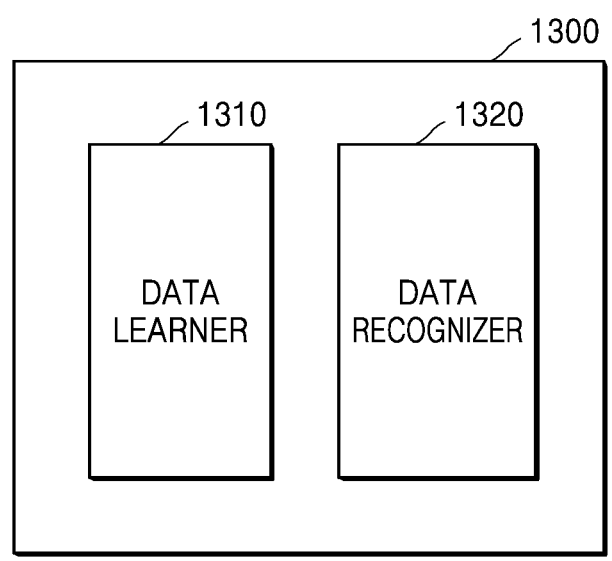
FIG. 13 is a block diagram of a processor of an electronic device, according to an embodiment.

As shown in FIG. 13, processor 1300 may comprise a data learner 1310 and a data recognizer 1320. FIGS. 13-16 described below is described as the processor 1300 of the electronic device 100. However, according to an embodiment, a processor 120 (FIG. 17) of the vehicle 200 may operate operations of the processor 1300 of FIG. 13.

Also, according to an embodiment, the electronic device 100 may recognize the object from the plurality of image frames obtained by capturing the surrounding environment of the first through third vehicles 200a, 200b, and 200c, the plurality of image frames being received from the first through third vehicles 200a, 200b, and 200c, and the recognizing being performed by using the deep learning-based trained data recognition model.

According to an embodiment, the data recognition model may be a pre-established model. For example, the data recognition model may be the model pre-established by receiving basic training data (for example, sample images, etc.).

Also, according to an embodiment, the data recognition model may be re-trained by using training data. For example, the data recognition model may be trained through unsupervised learning, whereby a standard for situation determination is discovered by self-learning data required for situation determination.

According to an embodiment, the electronic device 100 may train the data recognition model by using the plurality of image frames received from the vehicle 200 and a result of recognizing the object, as the training data.

According to an embodiment, even when a recognition rate at which an object is recognized from an image is low, when the object is determined to be the same object as an object in another image captured at the same time point, the electronic device 100 may use the image having the low object recognition rate and a result of data recognition, as the training data of the data recognition model. For example, when a first image has a low recognition rate for a human being object, but a determination has been made that an object in the first image is the same object as an object in a second image having a high recognition rate for being the human being object, it can be inferred that the image having the low recognition rate actually does have the human being object (in contradistinction to the low recognition rate).

For example, the electronic device 100 may increase an object recognition rate of the data recognition model by training the data recognition model by using a partial shape of an object, a significant portion which is covered by a shape of another object (e.g., a part of a side of a human head covered by a vehicle), and a result of object recognition, as the training data.

According to an embodiment, the electronic device 100 may transmit the data recognition model that is modified and refined to the first through third vehicles 200a, 200b, and 200c.

According to an embodiment, the vehicle 200 may more accurately recognize the object from the image by performing the object recognition by using the modified and refined data recognition model. Accordingly, the vehicle 200 may perform relatively safer and more accurate autonomous driving.

More detailed operations of the electronic device 100, according to an embodiment, will be described in more detail with reference to the drawings below.

FIG. 1 illustrates an embodiment and the disclosure is not limited thereto.

Figure 2:
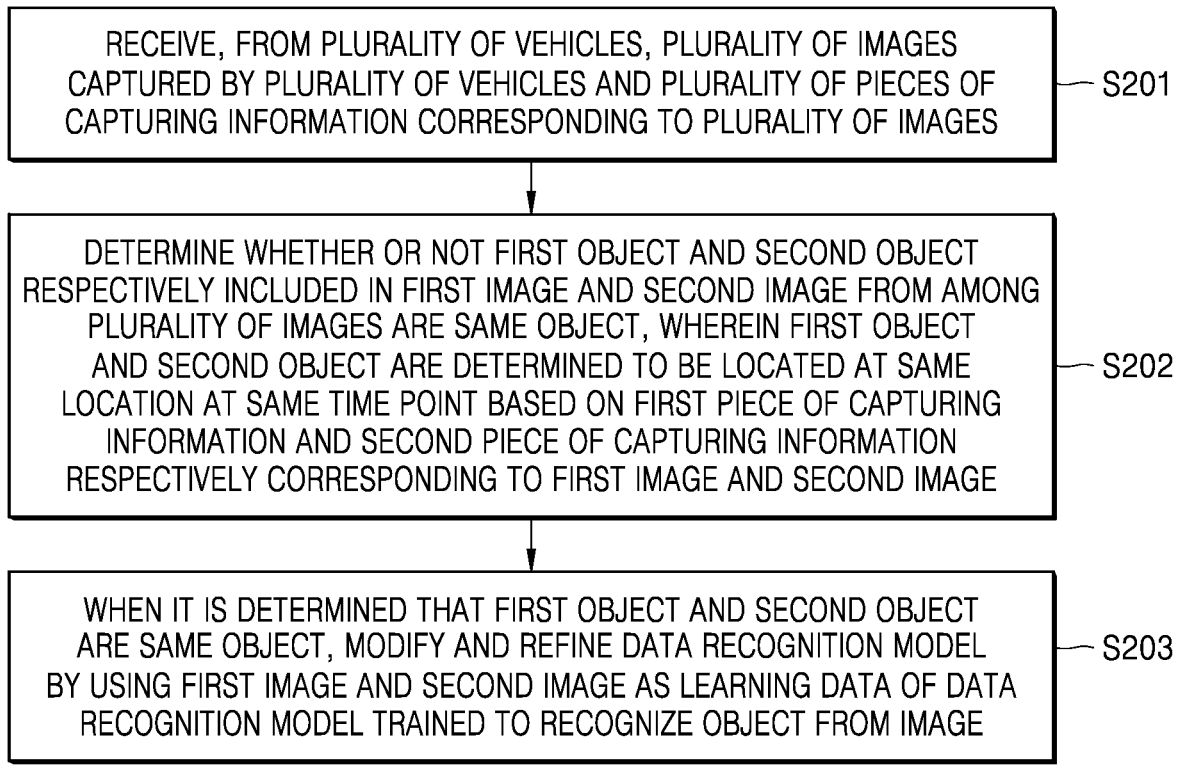
FIG. 2 is a flowchart of an operating method of an electronic device, according to an embodiment.
Figure 3:
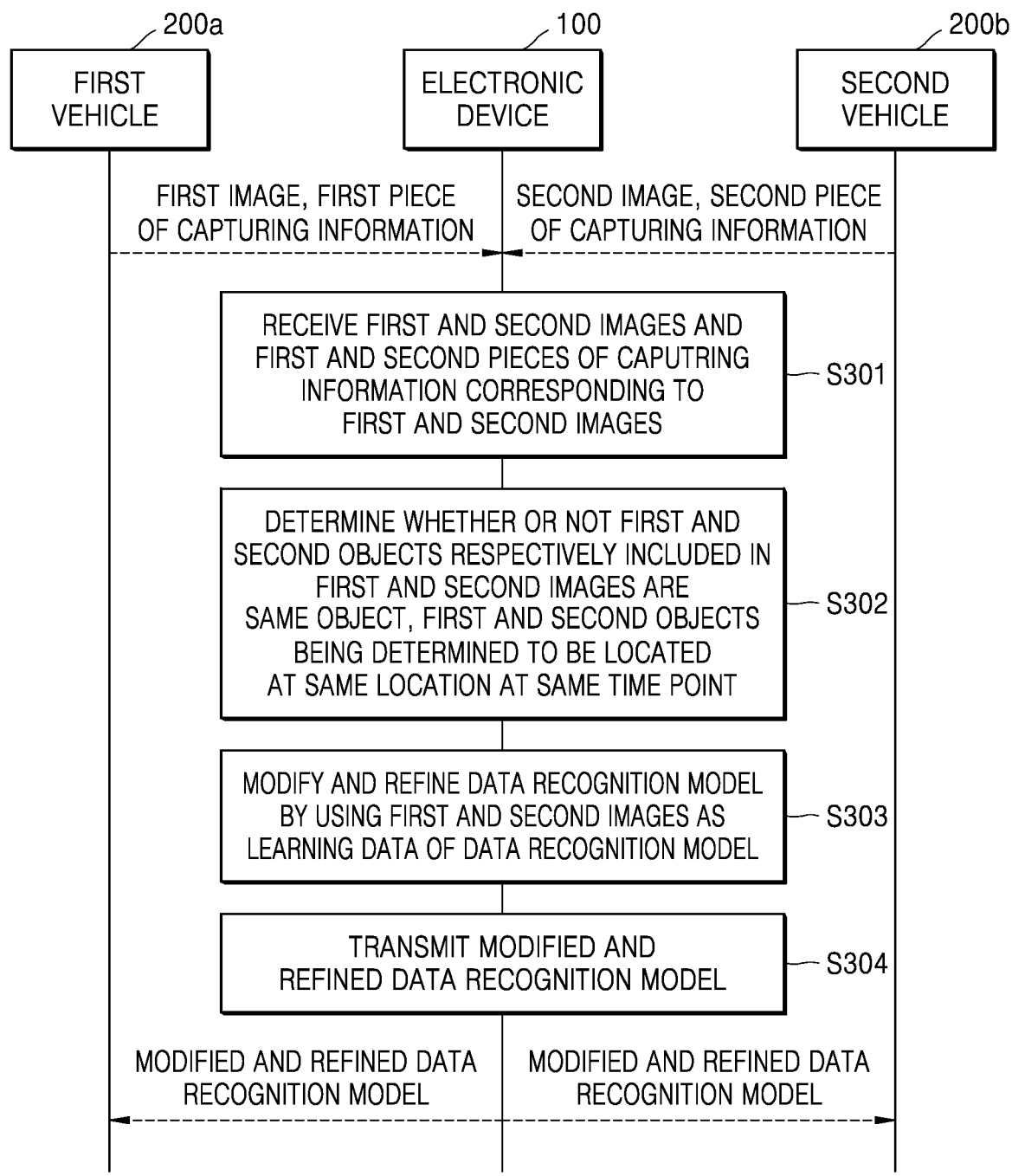
FIG. 3 is a flowchart of an operating method of an electronic device and a plurality of vehicles, according to an embodiment.

FIG. 2 is a flowchart of an operating method of the electronic device 100, according to an embodiment. FIG. 3 is a flowchart of an operating method of the electronic device 100 and a plurality of vehicles, according to an embodiment.

Figure 4:
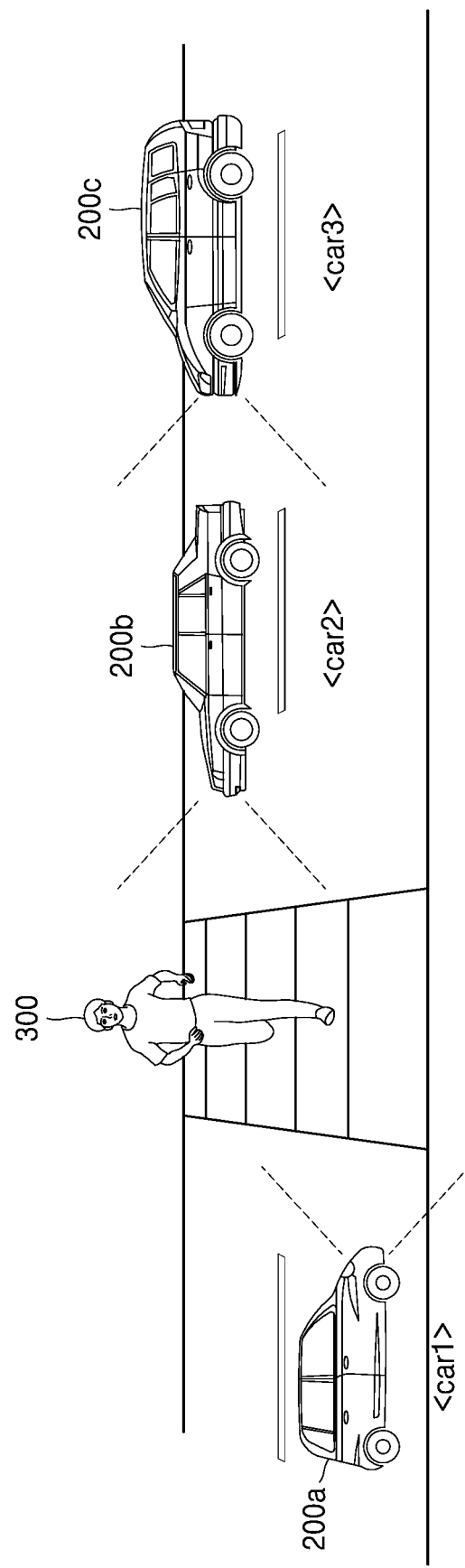
FIG. 4 is a view for describing an example in which a plurality of vehicles capture images while driving, according to an embodiment.
Figure 5:
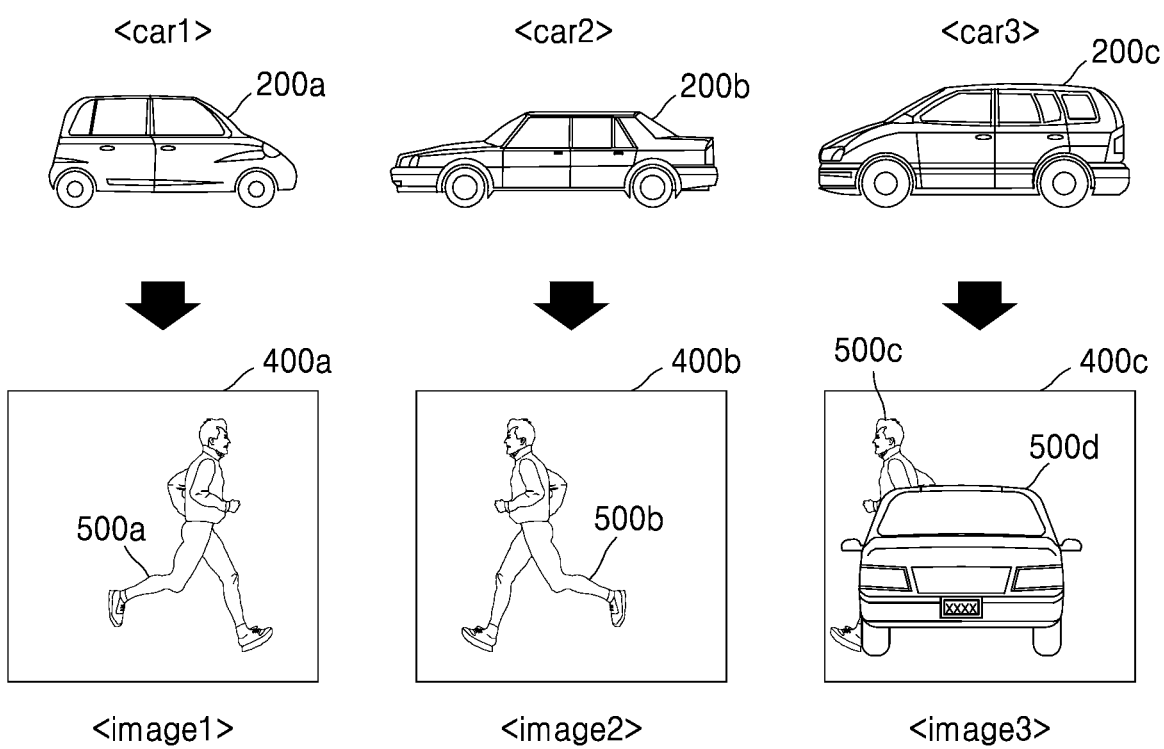
FIG. 5 is a view for describing an example of a plurality of images captured by a plurality of vehicles, according to an embodiment.

FIG. 4 is a view for describing an example of a plurality of images captured by a plurality of vehicles, according to an embodiment. FIG. 5 is a view for describing an example of using an image as input data for training a learning model, according to an embodiment.

Figure 6:
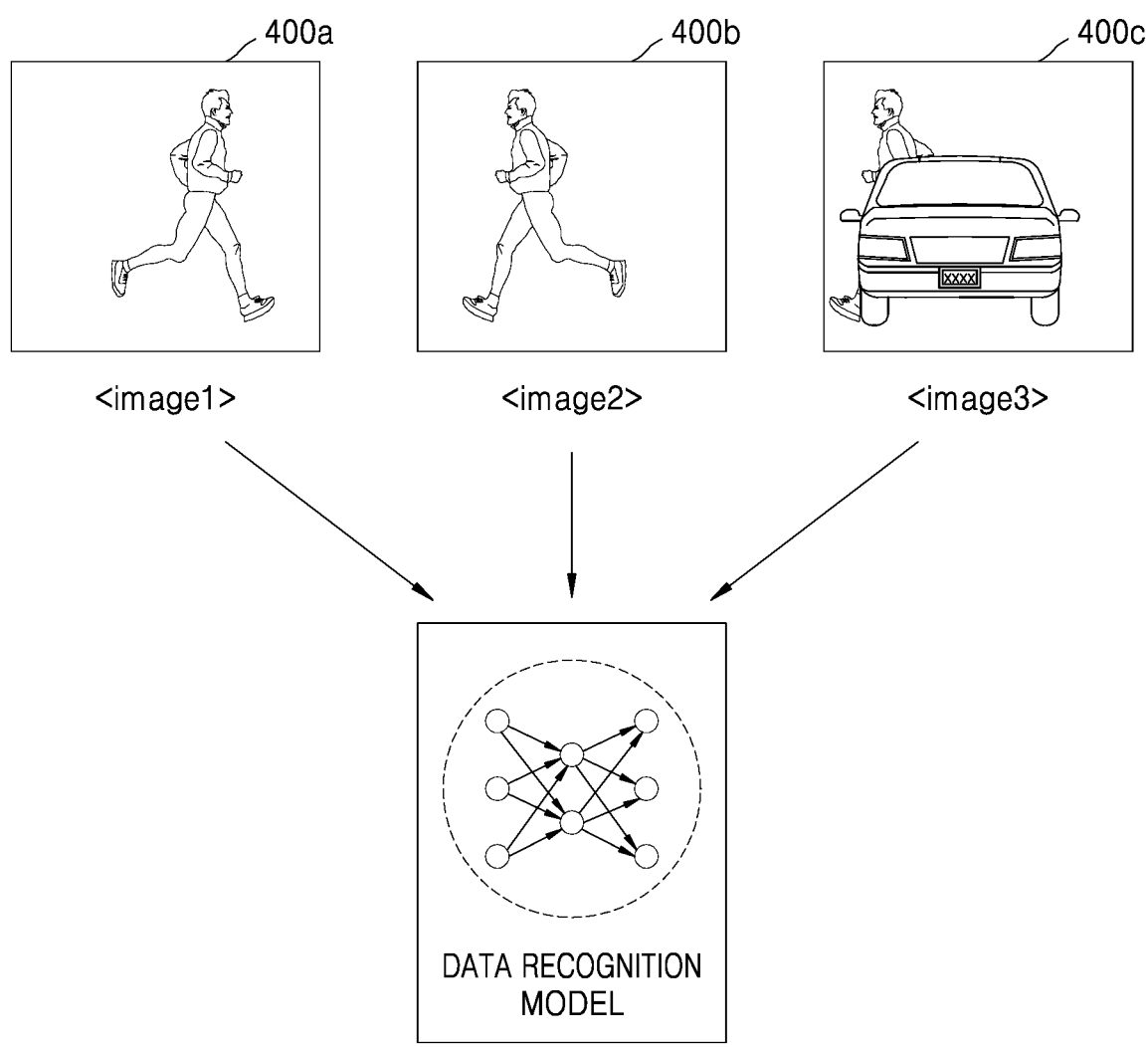
FIG. 6 is a view for describing an example of using an image as training data of a data recognition model, according to an embodiment.

The flowcharts of FIGS. 2 and 3 are described by referring to FIGS. 4 through 6.

In operation S201 of FIG. 2, the electronic device 100 may receive a plurality of images captured by a plurality of vehicles and a plurality of pieces of capturing information corresponding to the plurality of images, from the plurality of vehicles.

Figure 17:
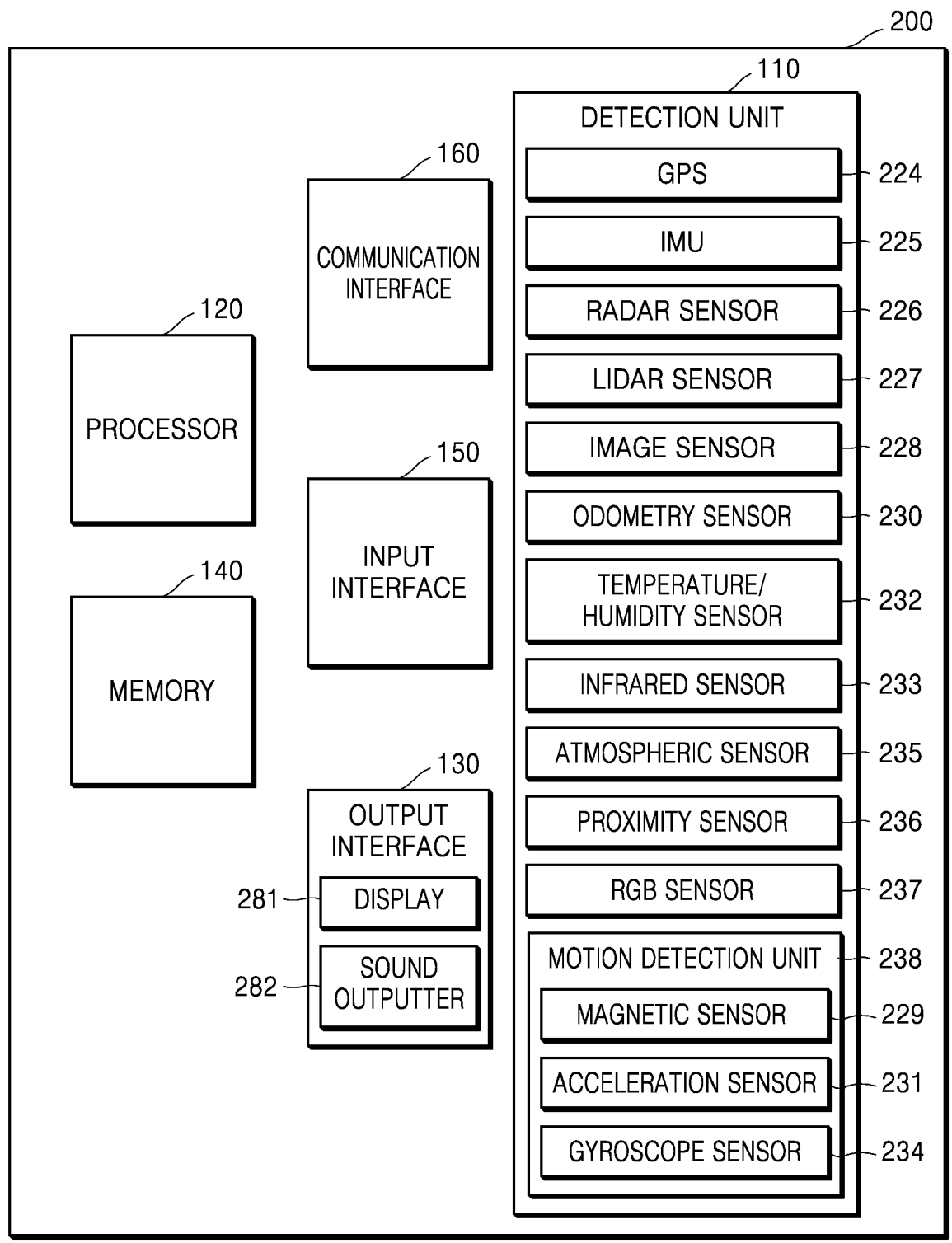
FIG. 17 is a block diagram of a vehicle according to an embodiment.

According to an embodiment, the vehicle 200 may capture a surrounding environment by using the image sensor 228 (FIG. 17) and transmit a plurality of images obtained by capturing the surrounding environment to the electronic device 100 through the communication interface 160 (FIG. 17).

According to an embodiment, the vehicle 200 may obtain capturing information corresponding to the captured image. The vehicle 200 may transmit the capturing information corresponding to the captured image to the electronic device 100 through the communication interface 160 (FIG. 17).

According to an embodiment, the capturing information may include information about a time point and information about a location at which an image is captured. For example, the information about the time point may include information about an hour, a minute, and a second at which the vehicle 200 captures the image. Also, for example, the information about the location may include a geographical location (for example, global positioning system (GPS) information) of an object in the image at a time point at which the vehicle 200 captures the image. Also, the information about the location may include information about a relative distance between a location of the vehicle 200 and the location of the object in the image and information about a relative direction. Also, the information about the location may include information about a relative distance between an object and another object in the image and information about a relative direction, but is not limited thereto.

FIG. 4 illustrates an example of a driving environment. Referring to FIG. 4, the first vehicle 200a, the second vehicle 200b, and the third vehicle 200c may capture a front side by using the image sensor 228 (FIG. 17) while driving. For example, there may be a pedestrian 300 crossing a crosswalk in front of the first vehicle 200a, the second vehicle 200b, and the third vehicle 200c according to an embodiment.

FIG. 5 illustrates examples of images captured by the first vehicle 200a, the second vehicle 200b, and the third vehicle 200c, respectively, in the driving environment illustrated in FIG. 4.

Referring to FIG. 5, a first image 400a captured by the first vehicle 200a may include a first object 500a. Also, a second image 400b captured by the second vehicle 200b may include a second object 500b. Also, a third image 400c captured by the third vehicle 200c may include a third object 500c and a fourth object 500d.

According to an embodiment, the first vehicle 200a may transmit the first image 400a and a first piece of capturing information corresponding to the first image 400a to the electronic device 100. Also, the second vehicle 200b may transmit the second image 400b and a second piece of capturing information corresponding to the second image 400b to the electronic device 100. Also, the third vehicle 200c may transmit the third image 400c and a third piece of capturing information corresponding to the third image 400c to the electronic device 100.

In operation S202 of FIG. 2, the electronic device 100 may determine whether a first object and a second object respectively included in a first image and a second image from among a plurality of images, the first and second object being determined to be located at the same location at the same time point based on the first and second pieces of capturing information corresponding to the first and second images, respectively, are the same as each other.

According to an embodiment, the electronic device 100 may identify a time point and a location at which the first image is captured, based on the first piece of capturing information corresponding to the first image. Also, the electronic device 100 may identify a time point and a location at which the second image is captured, based on the second piece of capturing information corresponding to the second image.

According to an embodiment, the electronic device 100 may detect the first object and the second object respectively included in the first image and the second image, the first object and the second object being determined to be located at the same location at the same time point.

Referring to FIGS. 4 and 5, the first object 500a included in the first image 400a and the second object 500b included in the second image 400b may be the pedestrian 300 (FIG. 4).

According to an embodiment, the electronic device 100 may determine whether or not the first object 500a included in the first image 400a and the second object 500b included in the second image 400b are the same object. Also, according to an embodiment, the electronic device 100 may determine whether or not the second object 500b included in the second image 400b and the third object 500c included in the third image 400c are the same object. Also, according to an embodiment, the electronic device 100 may determine whether or not the first object 500a included in the first image 400a and the third object 500c included in the third image 400c are the same object.

A detailed example of a method of determining whether or not a plurality of objects are the same object will be described below with reference to FIGS. 7 and 8, according to an embodiment.

In operation S203 of FIG. 2, when it is determined that the first object and the second object are the same object, the electronic device 100 may modify and refine a data recognition model by using the first and second images as training data of the data recognition model that is trained to recognize an object from an image (including actually performing the training).

Referring to FIG. 5, when it is determined that the first object 500a and the second object 500b are the same object, the electronic device 100 may use the first image 400a and the second image 400b as training data of the data recognition model that is trained to recognize an object from an image. Also, when it is determined that the second object 500b and the third object 500c are the same object, the electronic device 100 may use the second image 400b and the third image 400c as the training data of the data recognition model.

As illustrated in FIG. 6, according to an embodiment, the electronic device 100 may modify and refine the data recognition model by using the first image 400a, the second image 400b, and the third image 400c as the training data of the data recognition model.

FIG. 3 is the flowchart of the operation of the electronic device 100 and the plurality of vehicles, according to an embodiment.

In operation S301 of FIG. 3, the electronic device 100 may receive a first piece of capturing information and a second piece of capturing information corresponding to a first image and a second image, respectively.

According to an embodiment, the electronic device 100 may receive the first image and the first piece of capturing information corresponding to the first image from the first vehicle 200a. Also, according to an embodiment, the electronic device 100 may receive the second image and the second piece of capturing information corresponding to the second image from the second vehicle 200b.

In operation S302 of FIG. 3, the electronic device 100 may determine whether or not a first object included in the first image and a second object included in the second image, the first and second object being determined to be located at the same location at the same time point, are the same object.

Referring to FIGS. 4 and 5, for example, each of the first vehicle 200a and the second vehicle 200b may capture the pedestrian 300 at the front side. The electronic device 100 may determine whether or not the first object 500a included in the first image 400a captured by the first vehicle 200a and the second object 500b included in the second image 400b captured by the second vehicle 200b are the same object.

Also, referring to FIGS. 4 and 5, for example, each of the first vehicle 200a and the third vehicle 200c may capture the pedestrian 300 at the front side. The electronic device 100 may determine whether or not the first object 500a included in the first image 400a captured by the first vehicle 200a and the third object 500c included in the third image 400c captured by the third vehicle 200c are the same object.

In operation S303 of FIG. 3, the electronic device 100 may modify and refine a data recognition model by using the first and second images as training data of the data recognition model.

Referring to FIGS. 4 and 5, for example, when it is determined that the first object 500a included in the first image 400a and the second object 500b included in the second image 400b are the same object (for example, the pedestrian 300 (FIG. 4)), the data recognition model may be modified and refined by using the first image 400a and the second image 400b as the training data of the data recognition model.

Also, referring to FIGS. 4 and 5, for example, when it is determined that the first object 500a included in the first image 400a and the third object 500c included in the third image 400c are the same object (for example, the pedestrian 300 (FIG. 4)), the data recognition model may be modified and refined by using the first image 400a and the third image 400c as the training data of the data recognition model.

In operation S304 of FIG. 3, the electronic device 100 may transmit the modified and refined data recognition model to the first vehicle 200a and the second vehicle 200b.

According to an embodiment, the first vehicle 200a and the second vehicle 200b may use the data recognition model received from the electronic device 100 to recognize an object from a captured image. The first vehicle 200a and the second vehicle 200b may perform relatively more accurate object recognition by using the modified and refined data recognition model. Accordingly, the first vehicle 200a and the second vehicle 200b may perform relatively safer and more accurate autonomous driving.

FIGS. 2 through 6 illustrate an embodiment, and the disclosure is not limited thereto.

Figure 7:
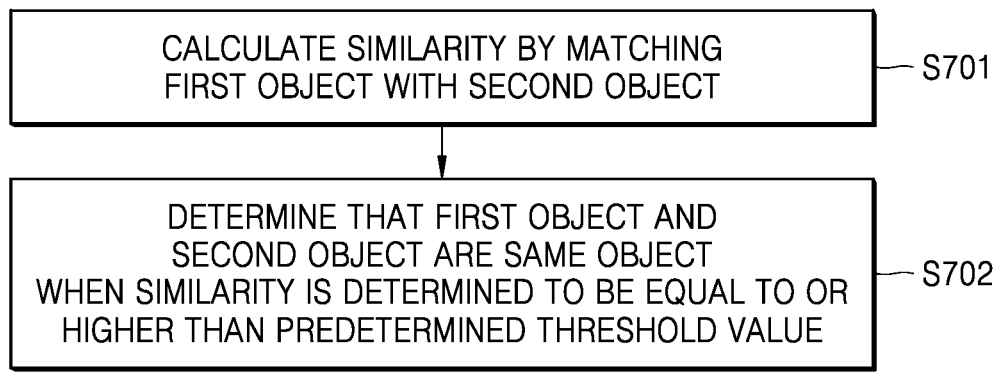
FIG. 7 is a flowchart for describing an example of determining whether or not a first object and a second object are the same object, according to an embodiment.

FIG. 7 is a flowchart for describing an example of determining whether or not a first object and a second object are the same object, according to an embodiment. FIG. 8 is a view for describing an example of determining whether or not a first object and a second object are the same object, according to an embodiment.

According to an embodiment, the electronic device 100 may determine whether or not an object in an image captured by the vehicle 200 is the same object as an object in another image captured at the same time point as the image, in order to determine whether or not to use the image captured by the vehicle 200 as training data of a data recognition model.

Figure 8:
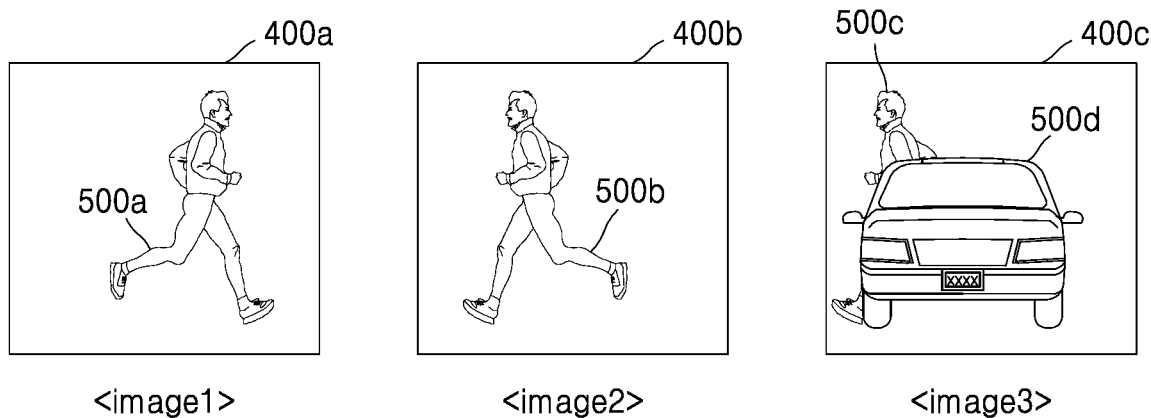
FIG. 8 is a view for describing an example of determining whether or not a first object and a second object are the same object, according to an embodiment.

Referring to FIG. 8, for example, the third object 500c may be only partially viewed in the third image 400c by being hidden due to a shape of the fourth object 500d. Thus, a recognition rate at which the electronic device 100 recognizes the third object 500c from the third image 400c may be low.

According to an embodiment, the electronic device 100 may use a result of recognizing an object from an image as training data of a data recognition model. Even when the recognition rate at which the electronic device 100 recognizes the third object 500c, based on a result of recognizing the third object 500c, is low, when the third object 500c is determined as the same object as the first object 500a and the second object 500b located at the same location at the same time point as the third object 500c, the electronic device 100 may use the third image 400c as the training data of the data recognition model.

Thus, the data recognition model may learn the partial shape of the third object 500c, a significant portion of which is covered by the shape of the fourth object 500d, and a result of recognizing the object, so as to have an improved object recognition rate. That is, according to an embodiment, the electronic device 100 may improve an accuracy of the data recognition model.

In operation S701 of FIG. 7, the electronic device 100 may calculate a similarity by matching the first object and the second object.

According to an embodiment, the electronic device 100 may determine whether or not the first object and the second object respectively included in a first image and a second image, the first object and the second object being determined to be located at the same location at the same point, are the same object.

Referring to FIG. 8, for example, the electronic device 100 may determine whether or not the first object 500a included in the first image 400a, the second object 500b included in the second image 400b, and the third object 500c included in the third image 400c are the same object.

The electronic device 100 may calculate a similarity by matching at least two objects. According to an embodiment, the electronic device 100 may compare at least two objects by using a hue, a saturation, a value, a color histogram, etc. of the at least two objects included in images. However, it is not limited thereto.

For example, the electronic device 100 may match the first object 500a with the third object 500c by using a hue, a saturation, and a value of the first object 500a and the third object 500c. The electronic device 100 may calculate the similarity by matching the first object 500a and the third object 500c.

Referring to FIG. 8, for example, a similarity between a first object 1 and a third object 3 may be calculated as 0.9. Also, for example, a similarity between the first object 1 and a second object 2 may be calculated as 0.8. Also, for example, a similarity between the second object 2 and the third object 3 may be calculated as 0.8.

In operation S702 of FIG. 7, when the similarity is determined to be equal to or higher than a pre-set threshold value, the electronic device 100 may determine that the first object and the second object are the same object.

Referring to FIG. 8, for example, when the similarity between the objects are determined to be equal to or higher than a pre-set threshold value (for example, a similarity of 0.8), the electronic device 100 may determine that the first object, object 1, the second object 2, and the third object 3 are the same object. However, it is not limited thereto.

According to an embodiment, other image processing techniques for determining whether or not objects are the same or determining a similarity between the objects may be applied, in order to determine whether or not objects included in different images are the same object.

FIGS. 7 and 8 illustrate an embodiment, and the disclosure is not limited thereto.

Figure 9:
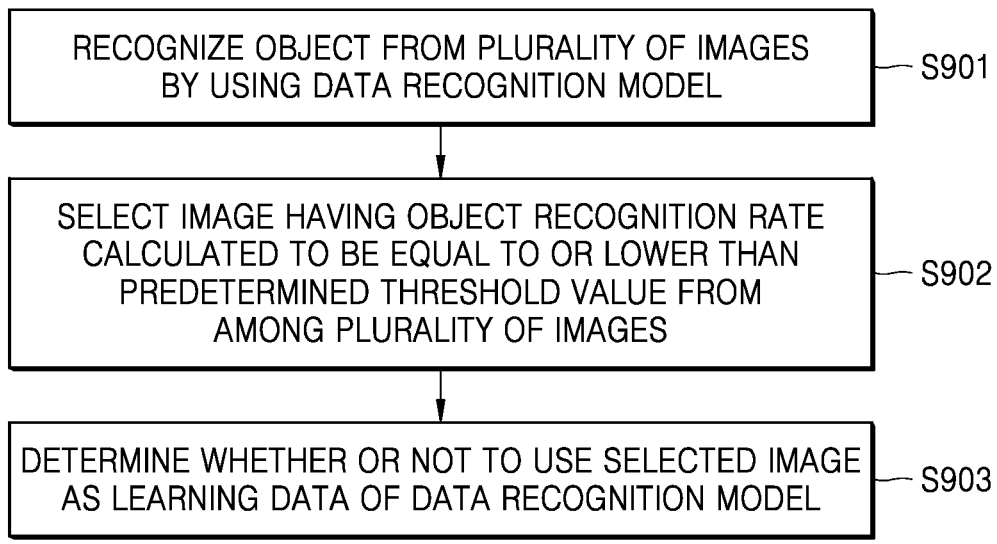
FIG. 9 is a flowchart for describing an example of selecting an image according to an object recognition rate, according to an embodiment.
Figure 10:
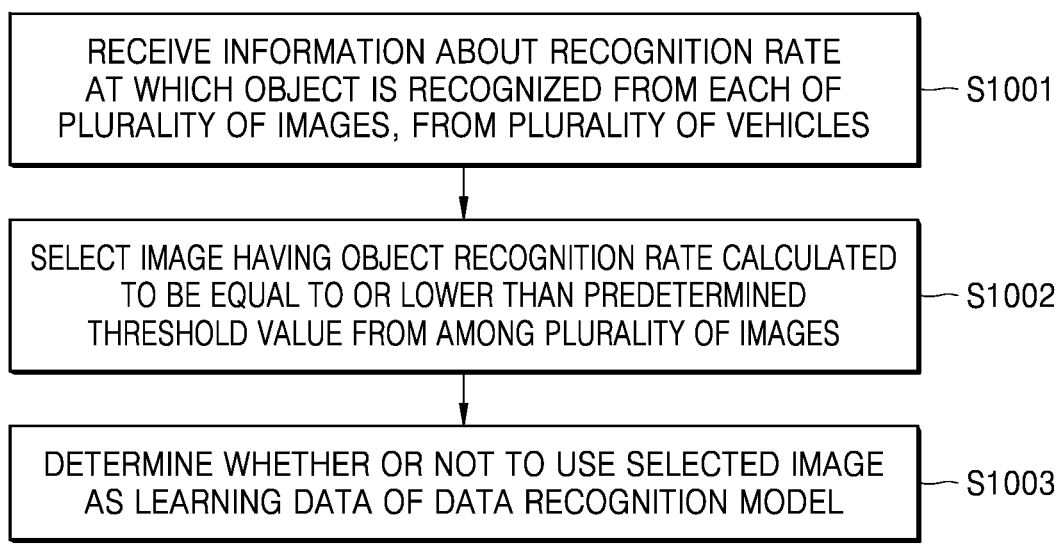
FIG. 10 is a flowchart for describing another example of selecting an image according to an object recognition rate, according to an embodiment.
Figure 11:
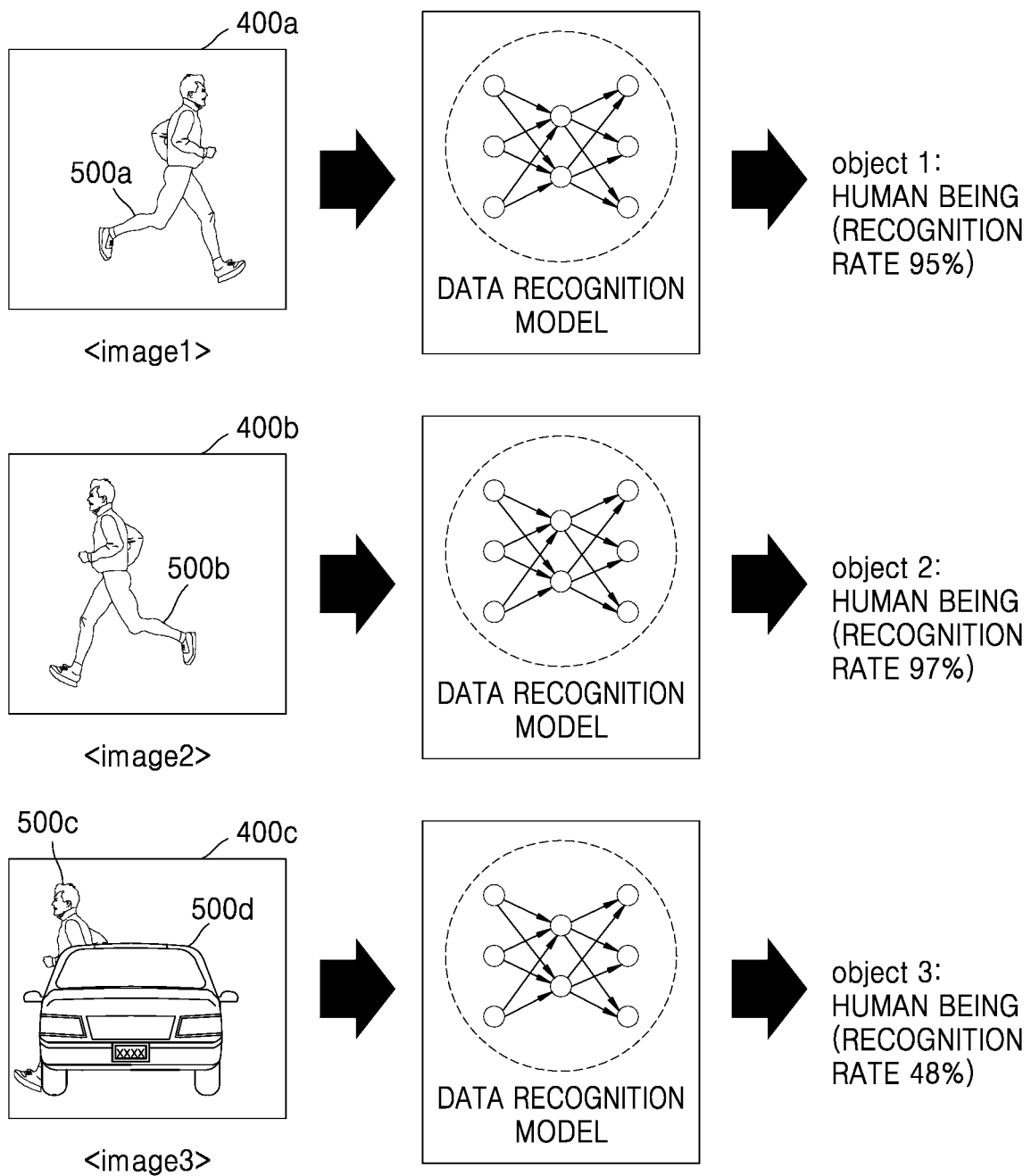
FIG. 11 is a view for describing an example of selecting an image according to an object recognition rate, according to an embodiment.

FIG. 9 is a flowchart of an example of selecting an image according to an object recognition rate, according to an embodiment. FIG. 10 is a flowchart of another example of selecting an image according to an object recognition rate, according to an embodiment. FIG. 11 is a view for describing an example of selecting an image according to an object recognition rate, according to an embodiment.

In operation S901 of FIG. 9, the electronic device 100 may recognize objects from a plurality of images by using a data recognition model.

According to an embodiment, the electronic device 100 may recognize objects from images received from the vehicle 200 (FIG. 1), by using the data recognition model trained to recognize an object from an image.

In operation S902 of FIG. 9, the electronic device 100 may select an image having an object recognition rate that is calculated to be equal to or lower than a pre-set threshold value, from among a plurality of images.

Referring to FIG. 11, for example, an object recognition rate, at which the first object 500a is recognized as "a human being," by inputting the first image 400a into a data recognition model may be 95%, an object recognition rate, at which the second object 500b in the second image 400b is recognized as "a human being," may be 97%, and an object recognition rate, at which the third object 500c in the third image 400c is recognized as "a human being," may be 48%.

For example, referring to FIG. 11, the electronic device 100 may select the third image 400c having the object recognition rate that is calculated to be equal to or lower than a pre-set threshold value (for example, 50%) from among the plurality of images.

In operation S903 of FIG. 9, the electronic device 100 may determine whether or not to use the selected image as training data of the data recognition model.

For example, referring to FIG. 11, the electronic device 100 may match the selected third image 400c with another image (for example, the first image 400a or the second image 400b) captured at the same time point as the third image 400c and may determine to use the third image 400c as the training data of the data recognition model. The electronic device 100 may determine the third object 500c included in the third image 400c having a low object recognition rate as the same object as the first object 500a included in the first image 400a captured at the same time point as the third image 400c and may determine to use the third image 400c having the low object recognition rate and a result of recognizing the third object 500c as the training data of the data recognition model. Thus, the data recognition model may be modified and refined to have the improved performance. For example, the data recognition model may include, as training data, images that would have been excluded based on object recognition rate, but that do in fact have a same object (e.g., a human being) as evidenced by an image captured by a different co-located camera.

FIG. 10 is a flowchart of an exemplary embodiment in which the electronic device 100 identifies object recognition rates of a plurality of images by receiving information about an object recognition rate of an image from the vehicle 200.

In operation S1001 of FIG. 10, the electronic device 100 may receive information about recognition rates at which objects are recognized from the plurality of images, from a plurality of vehicles.

According to an embodiment, the vehicle 200 may recognize an object from an image by using a data recognition model and may provide information about an object recognition rate of the image to the electronic device 100.

In operation S1002 of FIG. 10, the electronic device 100 may select an image having an object recognition rate calculated to be equal to or lower than a pre-set threshold value from the plurality of images. In operation S1003 of FIG. 10, the electronic device 100 may determine whether or not to use the selected image as training data of a data recognition model. Operations S1002 and S1003 correspond to operations S902 and S903 of FIG. 9.

FIGS. 9, 10, and 11 illustrate an embodiment, and the disclosure is not limited thereto.

Figure 12:
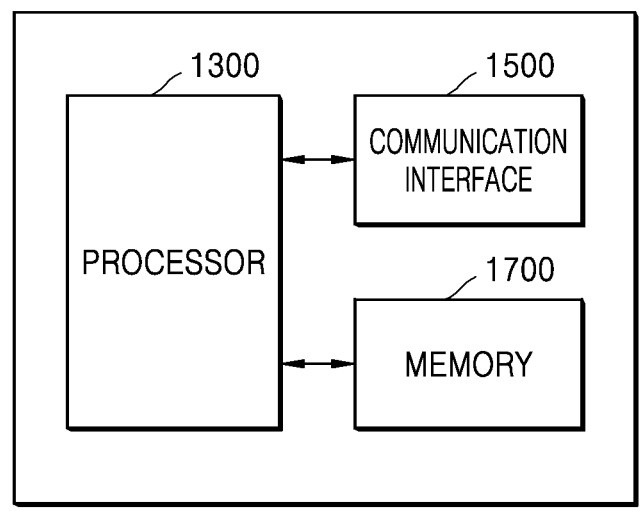
FIG. 12 is a block diagram of an electronic device according to an embodiment.

FIG. 12 is a block diagram of the electronic device 100 according to an embodiment.

According to an embodiment, the electronic device 100 may include a communication interface 1500, a memory 1700, and the processor 1300. The electronic device 100 illustrated in FIG. 12 includes only components related to the present embodiment. Thus, it will be understood by one of ordinary skill in the art that other general-purpose components than the components illustrated in FIG. 12 may further be included in the electronic device 100.

According to an embodiment, the processor 1300 may include at least one processor.

According to an embodiment, the processor 1300 may execute one or more instructions to receive, from a plurality of vehicles 200, a plurality of images captured by the plurality of vehicles 200 and a plurality of pieces of capturing information corresponding to the plurality of images, through the communication interface 1500.

Also, according to an embodiment, the processor 1300 may execute one or more instructions to determine whether or not a first object and a second object respectively included in a first image and a second image, the first object and the second object being determined to be located at the same location at the same time point based on a first piece of capturing information and a second piece of capturing information corresponding to the first image and the second image, respectively, from among the plurality of images, are the same object.

Also, according to an embodiment, the processor 1300 may execute one or more instructions to calculate a similarity by matching the first object with the second object, and when the similarity is determined to be equal to or higher than a pre-set threshold value, may determine that the first object and the second object are the same object.

Also, according to an embodiment, based on determining that the first object and the second object are the same object, the processor 1300 may execute one or more instructions to modify and refine a data recognition model that is trained to recognize the object from an image, by using the first image and the second image as training data of the data recognition model.

Also, the processor 1300 may execute one or more instructions to recognize objects from the plurality of images by using the data recognition model.

Also, the processor 1300 may execute one or more instructions to receive information about recognition rates at which the objects are recognized from the plurality of images, from the plurality of vehicles 200 through the communication interface 1500.

Also, the processor 1300 may execute one or more instructions to select an image having an object recognition rate that is calculated to be equal to or lower than a pre-set threshold value from among the plurality of images.

Also, the processor 1300 may execute one or more instructions to determine whether or not to use the selected image as training data of the data recognition model.

Also, the processor 1300 may execute one or more instructions to transmit the modified and refined recognition model to the plurality of vehicles 200 through the communication interface 1500.

The communication interface 1500 may include at least one antenna for wireless communication with another electronic device.

The communication interface 1500 controlled by the processor 1300 may be hardware, such as, a transceiver that transceives (transmits and receives) signals (e.g., radio signals). For example, the processor 1300 may execute a program included in the memory 1700 so that the communication interface 1500 may transmit and receive a wireless signal to and from a cellular network.

The communication interface 1500 may include one or more components that enable the electronic device 100 to communicate with external electronic devices. For example, the communication interface 1500 may include a short-range wireless communication interface and a mobile communication interface.

The short-range wireless communication interface may include a Bluetooth communication interface, a Bluetooth low energy communication interface, a near-field communication interface, a WLAN (Wi-Fi) communication interface, a Zigbee communication interface, an infrared data association (IrDA) communication interface, a Wi-Fi direct (WFD) communication interface, a ultrawide band (UWB) communication interface, an Ant+ communication interface, etc., but is not limited thereto.

According to an embodiment, the mobile communication interface may transceive wireless signals with at least one of a base station, an external terminal, or a server, via a mobile communication network. Here, the wireless signals may include various types of data.

According to an embodiment, the memory 1700 may store programs (e.g., including instructions, code, etc.) for processing and controlling of the processor 1300 and may store data input to the electronic device 100 or output from the electronic device 100.

According to an embodiment, the memory 1700 may include a memory of one or more of: a flash memory type, a hard disk type, a multimedia card micro type, or a card type (for example, an SD or XD memory). According to an embodiment, the memory 1700 may include at least one type of storage medium from among random-access memory (RAM), static RAM (SRAM), read-only memory (ROM), electrically erasable programmable ROM (EEPROM), programmable ROM (PROM), magnetic memory, magnetic disks, or optical disks.

FIG. 13 is a block diagram of the processor 1300 according to an embodiment.

Referring to FIG. 13, the processor 1300 according to an embodiment may include a data learner 1310 and a data recognizer 1320.

The data learner 1310 may learn a standard for determining a situation. The data learner 1310 may learn the standard about which data to use to determine a certain situation and how to determine the situation by using the data. The data learner 1310 may learn the standard for determining the situation by obtaining data to be used for learning and applying the obtained data to a data recognition model to be described below.

The data recognizer 1320 may determine the situation based on the data. The data recognizer 1320 may recognize the situation based on the certain data by using the data recognition model that is trained. The data recognizer 1320 may obtain the certain data based on a standard pre-set based on learning and may use the data recognition model by using the obtained data as an input value to determine the certain situation based on the certain data. Also, a result value output by the data recognition model with the obtained data as the input value may be used to modify and refine the data recognition model.

For example, an image captured by the vehicle 200 and a result of recognizing an object included in the image may be used to modify and refine the data recognition model that is trained to recognize an object from an image.

At least one of the data learner 1310 or the data recognizer 1320 may be formed in the form of at least one hardware chip and mounted in an electronic device. For example, at least one of the data learner 1310 or the data recognizer 1320 may be formed in the form of an exclusive hardware chip for AI or may be formed as part of a previous general-purpose processor (for example, a central processing unit (CPU) or an application processor) or a graphics exclusive processor (for example, a GPU) and mounted in various electronic devices described above.

In this case, the data learner 1310 and the data recognizer 1320 may be mounted in one electronic device or each may be mounted in a different electronic device. For example, one of the data learner 1310 and the data recognizer 1320 may be included in the electronic device and the other may be included in a server. Also, the data learner 1310 and the data recognizer 1320 may communicate with each other in a wired or wireless manner to provide model information established by the data learner 1310 to the data recognizer 1320 or provide input data into the data recognizer 1320 to the data learner 1310 as additional training data.

At least one of the data learner 1310 or the data recognizer 1320 may be realized as a software module. When the at least one of the data learner 1310 or the data recognizer 1320 is realized as the software module (or a program module including an instruction), the software module may be stored in a non-transitory computer readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 14:
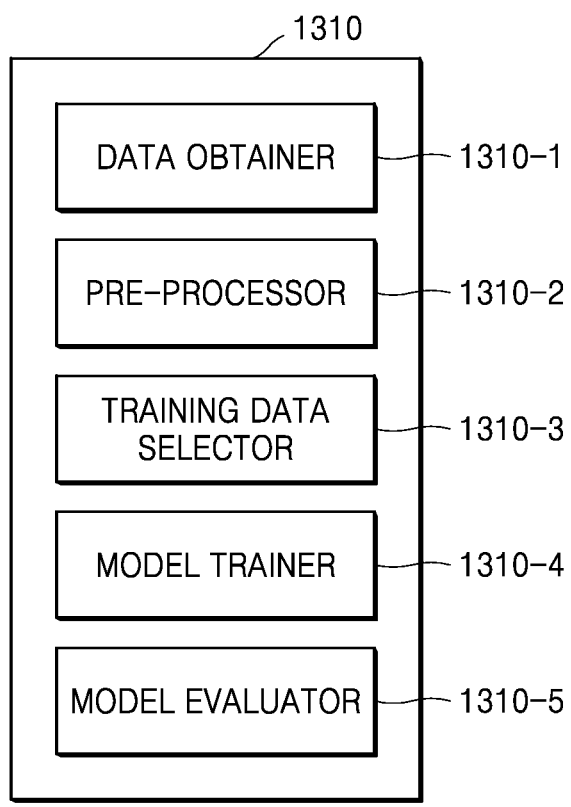
FIG. 14 is a block diagram of a data learner according to an embodiment.

FIG. 14 is a block diagram of the data learner 1310 according to an embodiment.

Referring to FIG. 14, the data learner 1310 according to one or more embodiments may include a data obtainer 1310-1, a pre-processor 1310-2, a training data selector 1310-3, a model trainer 1310-4, and a model evaluator 1310-5.

According to an embodiment, the data obtainer 1310-1 may obtain data that is required to determine a situation. For example, the data obtainer 1310-1 may obtain data that is required for learning for determining the situation. Also, the data obtainer 1310-1 may receive data from a server.

For example, the data obtainer 1310-1 may receive an image of a surrounding environment of the vehicle 200. The image of the surrounding environment may include a plurality of images (or image frames). For example, the data obtainer 1310-1 may receive a video through a camera of an electronic device including the data learner 1310 or an external camera (for example, a closed-circuit television (CCTV) or a black box) capable of communicating with the electronic device including the data learner 1310. Here, the camera may include one or more image sensors (for example, a front sensor or a rear sensor), one or more lenses, an image signal processor (ISP), or a flash (for example, a light-emitting diode (LED), a xenon lamp, etc.).

Also, for example, the data obtainer 1310-1 may receive data through an input device (e.g., a microphone, a camera, a sensor, etc.) of an electronic device. Alternatively, the data obtainer 1310-1 may obtain data through an external device communicating with the electronic device.

The pre-processor 1310-2 may pre-process the obtained data so that the obtained data may be used for learning for determining the situation. The pre-processor 1310-2 may process the obtained data into a pre-set format so that the model trainer 1310-4 described below may use the obtained data for learning for determining the situation.

According to an embodiment, the training data selector 1310-3 may select the data required for learning from the pre-processed data. The selected data may be provided to the model trainer 1310-4. The training data selector 1310-3 may select data required for training from the pre-processed data, according to the pre-set standard for determining the situation. Also, the training data selector 1310-3 may select the data based on a reference pre-set via training by the model trainer 1310-4 as described below.

For example, an image captured by the vehicle 200 and data about a result of recognizing an object included in the image may be selected.

The model trainer 1310-4 may learn a standard about how to determine the situation based on training data. Also, the model trainer 1310-4 may learn a standard about which training data to use to determine the situation.

Also, the model trainer 1310-4 may train a data recognition model that is used to determine the situation by using the training data. According to an embodiment, the data recognition model may be a pre-established model. For example, the data recognition model may be the model pre-established by receiving basic training data (for example, sample images, etc.).

The data recognition model may be established by taking into account an application field of the recognition model, the purpose of learning, or the computer performance of a device. The data recognition model may be, for example, a model based on a neural network. For example, a CNN, a DNN, an RNN, a BRDNN, etc. may be used as the data recognition model, but it is not limited thereto.

According to various embodiments, when there are a plurality of pre-established data recognition models, the model trainer 1310-4 may determine a data recognition model having a great relevance between input training data and basic training data as the data recognition model for learning. According to an embodiment, the basic training data may be pre-classified into types of the data and the data recognition model may be pre-established for the types of the data. For example, the basic training data may be pre-classified based on various references, such as a region in which the training data is generated, a time in which the training data is generated, a size of the training data, a genre of the training data, a generator of the training data, a type of an object in the training data, etc.

Also, the model trainer 1310-4 may train the data recognition model by using, for example, learning algorithms, such as error back-propagation and gradient descent.

Also, according to an embodiment, the model trainer 1310-4 may train the data recognition model, for example, through supervised learning in which the training data is used as an input value. Also, according to an embodiment, the model trainer 1310-4 may train the data recognition model, for example, through unsupervised learning, whereby a standard for determining a situation is discovered by self-learning a type of data required for situation determination without specific instructions. Also, according to an embodiment, the model trainer 1310-4 may train the data recognition model, for example, through reinforcement learning, whereby feedback about whether a result of determining the situation based on learning is correct or not is used.

Also, according to an embodiment, when the data recognition model is trained, the model trainer 1310-4 may store the trained data recognition model. In this case, the model trainer 1310-4 may store the trained data recognition model on the memory of the electronic device including the data recognizer 1320. Alternatively, according to an embodiment, the model trainer 1310-4 may store the trained data recognition model on the memory of the electronic device including the data recognizer 1320 to be described below. Alternatively, according to an embodiment, the model trainer 1310-4 may store the trained data recognition model on a memory of a server connected with the electronic device in a wired or wireless network.

In this case, according to an embodiment, the memory on which the trained data recognition model is stored may also store, for example, commands or data related to at least another component of the electronic device. Also, the memory may store software and/or programs. The programs may include, for example, kernel, middleware, an application programming interface (API) and/or an application program (or an "application").

According to an embodiment, the model evaluator 1310-5 may input evaluation data in the data recognition model and when a recognition result output from the evaluation data does not meet a pre-set reference, may have the model trainer 1310-4 re-learn. In this case, the evaluation data may be the data pre-set for evaluating the data recognition model.

For example, according to an embodiment, the model evaluator 1310-5 may evaluate that the recognition result does not meet the pre-set reference, when the number of pieces of the evaluation data for which the recognition result is not correct or the rate of the evaluation data for which the recognition result is not correct exceeds a pre-set critical value, from among recognition results of the trained data recognition model with respect to the evaluation data. For example, according to an embodiment, when the pre-set reference is defined as 2% and when the trained data recognition model outputs incorrect recognition results with respect to the pieces of evaluation data that are more than twenty (20) out of the total one thousand (1,000) pieces of evaluation data, the model evaluator 1310-5 may evaluate that the trained data recognition model is not appropriate.

Meanwhile, according to an embodiment, when there are a plurality of trained data recognition models, the model evaluator 1310-5 may evaluate whether each of the trained data recognition models meets a pre-set reference and may determine the model meeting the pre-set reference as the final data recognition model. In this case, when there are a plurality of models meeting the pre-set reference, the model evaluator 1310-5 may determine one pre-set model or a pre-set number of models as the final data recognition models, based on the order of the score of the evaluation.

Meanwhile, at least one of the data obtainer 1310-1, the pre-processor 1310-2, the training data selector 1310-3, the model trainer 1310-4, or the model evaluator 1310-5 in the data learner 1310 may be formed in the form of at least one hardware chip and may be mounted in the electronic device. For example, at least one of the data obtainer 1310-1, the pre-processor 1310-2, the training data selector 1310-3, the model trainer 1310-4, or the model evaluator 1310-5 may be formed in the form of an exclusive hardware chip for AI, or may be formed as a part of a previous general-purpose processor (for example, a CPU or an application processor) or a graphics exclusive processor (for example, a GPU) and may be mounted in various electronic devices described above.

Also, the data obtainer 1310-1, the pre-processor 1310-2, the training data selector 1310-3, the model trainer 1310-4, and the model evaluator 1310-5 may be mounted in one electronic device or each may be mounted in a separate electronic device. For example, some of the data obtainer 1310-1, the pre-processor 1310-2, the training data selector 1310-3, the model trainer 1310-4, and the model evaluator 1310-5 may be included in the electronic device and the others may be included in a server.

Also, at least one of the data obtainer 1310-1, the pre-processor 1310-2, the training data selector 1310-3, the model trainer 1310-4, or the model evaluator 1310-5 may be realized as a software module. When the at least one of the data obtainer 1310-1, the pre-processor 1310-2, the training data selector 1310-3, the model trainer 1310-4, or the model evaluator 1310-5 is realized as the software module (or a program module including an instruction), the software module may be stored in a non-transitory computer readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 15:
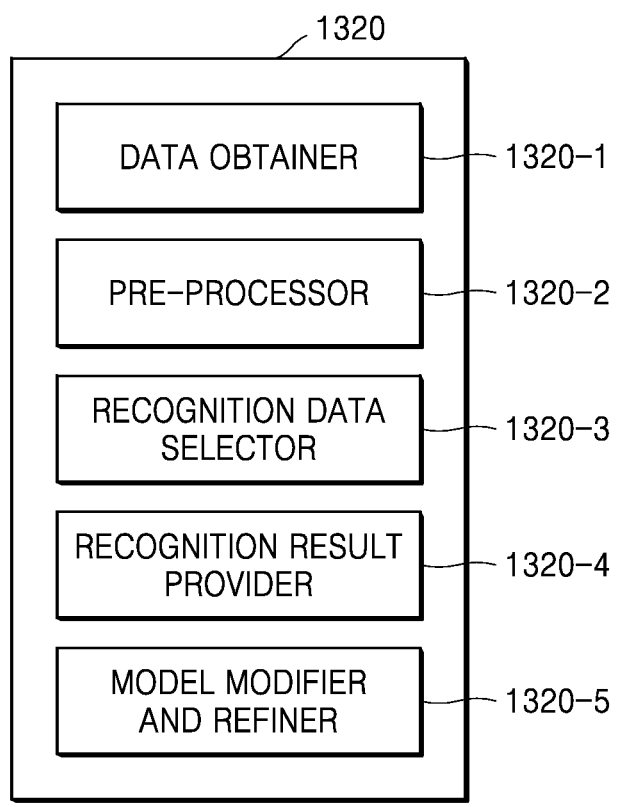
FIG. 15 is a block diagram of a data recognizer according to an embodiment.

FIG. 15 is a block diagram of the data recognizer 1320 according to an embodiment.

Referring to FIG. 15, the data recognizer 1320 according to one or more embodiments may include a data obtainer 1320-1, a pre-processor 1320-2, a recognition data selector 1320-3, a recognition result provider 1320-4, and a model modifier and refiner 1320-5.

The data obtainer 1320-1 may obtain data required for situation determination and the pre-processor 1320-2 may pre-process the obtained data to be used for situation determination. The pre-processor 1320-2 may process the obtained data into a pre-set format so that the recognition result provider 1320-4 to be described below may use the obtained data to determine a situation.

The recognition data selector 1320-3 may select the data required for determining the situation from the pre-processed data. The selected data may be provided to the recognition result provider 1320-4. The recognition data selector 1320-3 may select part or all of the pre-processed data according to a pre-set standard for determining the situation. Also, the recognition data selector 1320-3 may select the data according to a standard pre-set based on learning by the model trainer 1310-4 to be described below.

The recognition result provider 1320-4 may determine the situation, by applying the selected data to the data recognition model. The recognition result provider 1320-4 may provide the recognition result according to the purpose of data recognition. The recognition result provider 1320-4 may apply the selected data to the data recognition model by using the data selected by the recognition data selector 1320-3 as an input value. Also, the recognition result may be determined by the data recognition model.

According to an embodiment, the recognition result may be provided in the form of text, sound, video, image, or instructions (e.g., application execution instructions, module function execution instructions, etc.).

The model modifier and refiner 1320-5 may allow the data recognition model to be modified and refined based on the evaluation about the recognition result provided by the recognition result provider 1320-4. For example, the model modifier and refiner 1320-5 may provide the recognition result provided by the recognition result provider 1320-4 to the model trainer 1310-4 to allow the model trainer 1310-4 to modify and refine the data recognition model by performing training.

Meanwhile, at least one of the data obtainer 1320-1, the pre-processor 1320-2, the recognition data selector 1320-3, the recognition result provider 1320-4, or the model modifier and refiner 1320-5 in the data recognizer 1320 may be formed in the form of at least one hardware chip and may be mounted in an electronic device. For example, at least one of the data obtainer 1320-1, the pre-processor 1320-2, the recognition data selector 1320-3, the recognition result provider 1320-4, or the model modifier and refiner 1320-5 may be formed in the form of an exclusive hardware chip for AI or may be formed as a part of a previous general-purpose processor (for example, a CPU or an application processor) or a graphics exclusive processor (for example, a GPU) and may be mounted in various electronic devices described above.

Also, the data obtainer 1320-1, the pre-processor 1320-2, the recognition data selector 1320-3, the recognition result provider 1320-4, and the model modifier and refiner 1320-5 may be mounted in one electronic device or each may be mounted in a separate electronic device. For example, some of the data obtainer 1320-1, the pre-processor 1320-2, the recognition data selector 1320-3, the recognition result provider 1320-4, and the model modifier and refiner 1320-5 may be included in electronic device and the others may be included in a server.

Also, at least one of the data obtainer 1320-1, the pre-processor 1320-2, the recognition data selector 1320-3, the recognition result provider 1320-4, or the model modifier and refiner 1320-5 may be realized as a software module. When the at least one of the data obtainer 1320-1, the pre-processor 1320-2, the recognition data selector 1320-3, the recognition result provider 1320-4, or the model modifier and refiner 1320-5 is realized as a software module (or a program module including an instruction), the software module may be stored in a non-transitory computer readable recording medium. Also, in this case, the at least one software module may be provided by an OS or a certain application. Alternatively, a portion of the at least one software module may be provided by the OS and the other portion of the at least one software module may be provided by a certain application.

FIG. 18 is a view showing an example in which a device and a server learn and recognize data by interworking with each other, according to one or more embodiments.

Figure 16:
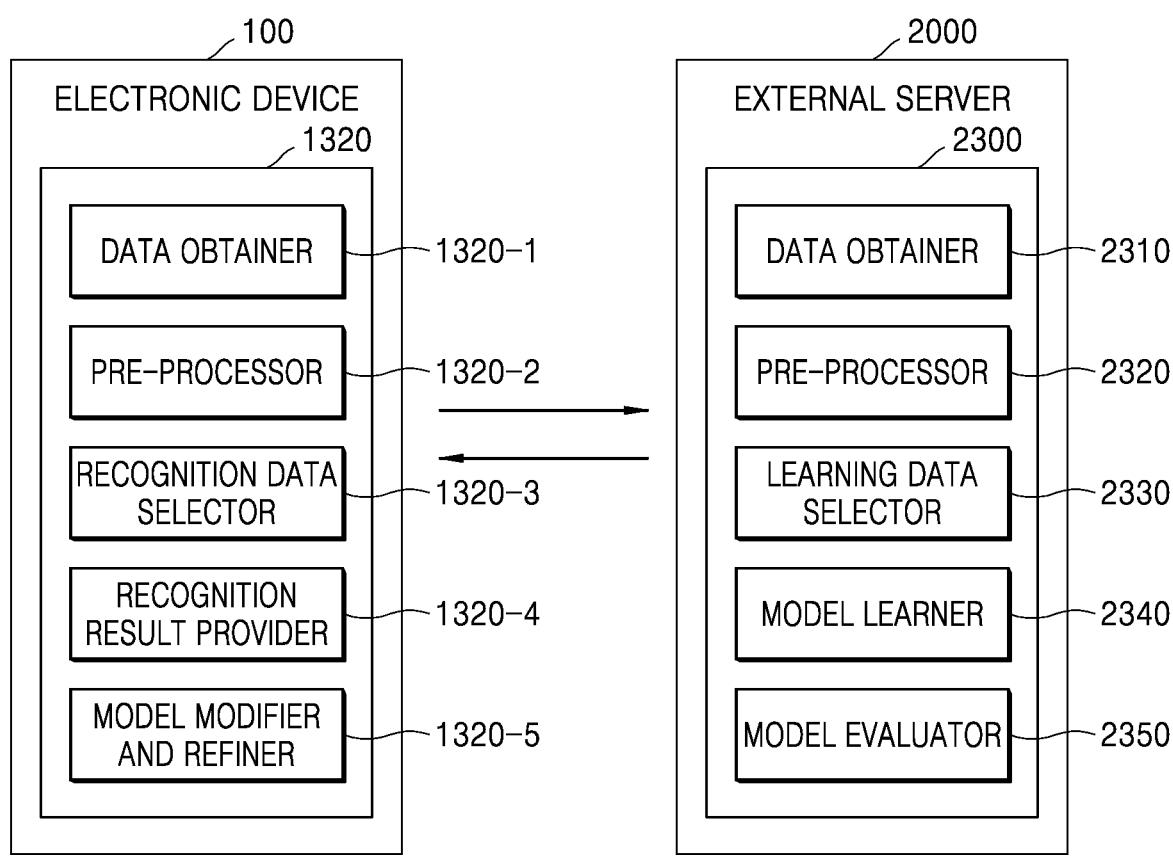
FIG. 16 is a view showing an example in which an electronic device and an external server learn and recognize data by interworking with each other, according to an embodiment.

FIG. 16 is a view of an example in which the electronic device 100 and an external server 2000 learn and recognize data by interworking with each other, according to an embodiment.

Referring to FIG. 16, the external server 2000 may learn a standard for determining a situation, and the electronic device 100 may determine the situation based on a learning result of the external server 2000.

In this case, a model trainer 2340 of the external server 2000 may perform the function of the data learner 1310 illustrated in FIG. 14. The model trainer 2340 of the external server 2000 may learn the standard about which data to use to determine a certain situation and how to determine the situation by using the data. The model trainer 2340 may learn the standard for determining a situation by obtaining data to be used for learning and applying the obtained data to a data recognition model to be described below.

Also, the recognition result provider 1320-4 of the electronic device 100 may determine the situation by applying data selected by the recognition data selector 1320-3 to a data recognition model generated by the external server 2000. For example, the recognition result provider 1320-4 may transmit the data selected by the recognition data selector 1320-3 to the external server 2000 and may request the external server 2000 to determine the situation by applying the data selected by the recognition data selector 1320-3 to the data recognition model. Also, the recognition result provider 1320-4 may receive information about the situation determined by the external server 2000 from the external server 2000.

For example, the electronic device 100 may transmit an image frame to the external server 2000 and request the external server 2000 to recognize an object by applying the image frame into the data recognition model. Also, the electronic device 100 may receive information about recognition of an object determined by the external server 2000 from the external server 2000.

Alternatively, the recognition result provider 1320-4 of the electronic device 100 may receive a recognition model generated by the external server 2000 from the external server 2000 and may determine the situation by using the received recognition model. In this case, the recognition result provider 1320-4 may determine the situation by applying the data selected by the recognition data selector 1320-3 to the data recognition model received from the external server 2000.

For example, the electronic device 100 may recognize an object by applying an image frame to the data recognition model received from the external server 2000.

FIG. 17 is a block diagram of the vehicle 200 according to an embodiment.

The vehicle 200 may include a detection unit 110, a processor 120, an output interface 130, a memory (or storage) 140, an input interface 150, and a communication interface 160.

According to an embodiment, the detection unit 110 may include a plurality of sensors configured to detect information about a peripheral environment in which the vehicle 200 is located and may include one or more actuators configured to change a location and/or alignment of the sensors. For example, the detection unit 110 may include a GPS receiver 224, an inertial measurement unit (IMU) 225, the RADAR sensor 226, the LIDAR sensor 227, the image sensor 228, and an odometry sensor 230. According to an embodiment, the detection unit 110 may include at least one of a temperature/humidity sensor 232, an infrared sensor 233, an atmospheric sensor 235, a proximity sensor 236, or an RGB sensor (illuminance sensor) 237, but it is not limited thereto. The function of each of the sensors may be intuitively inferred by one of ordinary skill in the art from its name, and thus, its detailed description will be omitted.

Also, the detection unit 110 may include a motion sensor 238 capable of detecting motion. The motion sensor 238 may include one or more of: a magnetic sensor 229, an acceleration sensor 230, or a gyroscope sensor 234.

The GPS receiver 224 may be configured to estimate a geographical location of the vehicle 200. That is, the GPS receiver 224 may include a transceiver configured to estimate a location of the vehicle 200 with respect to the earth.

According to an embodiment, the IMU 225 may be a combination of sensors configured to detect changes of location and alignment of the vehicle 200 based on inertia acceleration. For example, the combination of sensors may include accelerometers and gyroscopes.

According to an embodiment, the RADAR sensor 226 may be configured to sense objects in a driving environment in which the vehicle 200 is located by using radio signals. Also, the RADAR sensor 226 may be configured to detect a speed and/or a direction of the objects.

According to an embodiment, the LIDAR sensor 227 may be configured to detect objects in a driving environment in which the vehicle 200 is located by using a laser beam. In more detail, the LIDAR sensor 227 may include a laser light source and/or a laser scanner configured to emit a laser beam, and a sensor configured to detect reflection of the laser beam. The LIDAR sensor 227 may be configured to operate in a coherent (for example, using heterodyne detection) or an incoherent detection mode. According to an embodiment, the image sensor 228 may include a still camera or a video camera, which may be configured to record an external environment of the vehicle 200. For example, the image sensor 228 may include a plurality of cameras and the plurality of cameras may be arranged in a plurality of locations inside or outside of the vehicle 200.

According to an embodiment, the odometry sensor 230 may estimate a location of the vehicle 200 and measure a moving distance. For example, the odometry sensor 230 may measure a value of a change of location of the vehicle 200 by using the number of rotations of a wheel of the vehicle 200.

According to an embodiment, the memory 140 may include at least one of: a magnetic disk drive, an optical disk drive, or a flash memory. Alternatively, the memory 140 may include a portable universal serial bus (USB) data storage. The memory 140 may store system software for executing examples one or more embodiments related to the present disclosure. The system software for executing the examples related to the present disclosure may be stored in a portable storage medium.

The communication interface 160 may include at least one antenna for wireless communication with another device. For example, the communication interface 160 may be used to wirelessly communicate with a cellular network or other wireless protocols and systems through Wi-Fi or Bluetooth. The communication interface 160 controlled by the processor 120 may transceive radio signals. For example, the processor 120 may execute a program included in the storage 140 so that the communication interface 160 may transmit and receive a wireless signal to and from a cellular network.

The input interface 150 denotes a device for a user to input data for controlling the vehicle 200. For example, the input interface 150 may include one or more of: a key pad, a dome switch, a touch pad (a touch capacitance method, a pressure resistive method, an infrared detection method, a surface ultrasonic conductive method, an integral tension measuring method, a piezo effect method, etc.), a jog wheel, a jog switch, etc., but it is not limited thereto. Also, the input interface 150 may include a microphone and may be configured to receive an audio signal (for example, a voice command) from an occupant of the vehicle 200, according to an embodiment.

The output interface 130 may output an audio signal or a video signal, and the output interface 130 may include a display 281 and a sound output interface 282.

The display 2811 may include at least one of a liquid crystal display, a thin film transistor-liquid crystal display, an organic light-emitting diode, a flexible display, a three-dimensional (3D) display, or an electrophoretic display. The output interface 130 may include two or more displays 281.

The sound output interface 282 may output audio data received from the communication interface 160 or stored in the memory 140. The sound output interface282 may include a speaker, a buzzer, etc.

The input interface 150 and the output interface 130 may include a network interface and may be realized as a touch screen.

The processor 120 may execute the programs stored in the memory 140 to generally control the detection unit 110, the communication interface 160, the input interface 150, the memory 140, and the output interface 130.

The electronic devices according to the embodiments described herein may include a processor, a memory for storing program data and executing the program data, a permanent storage such as a disk drive, a communication port for handling communications with external devices, and user interface devices, etc. Methods implemented as software modules or may be stored on a computer-readable recording medium as computer-readable codes executable by the processor or program commands. Examples of computer-readable recording media may include magnetic storage media (for example, read-only memory (ROM), random-access memory (RAM), floppy disks, hard disks, etc.), optical reading media (for example, compact disc (CD)-ROM, a digital versatile disc (DVD), etc.), etc. The computer-readable recording media may be distributed in computer systems connected in networks and computer-readable codes may be stored and executed in a distributed fashion. Media may be computer-readable, stored in a memory and executed by a processor.

The embodiments may be indicated as functional block components and various processing operations. The functional blocks may be implemented as various numbers of hardware and/or software components performing specific functions. For example, the embodiments may implement direct circuit components, such as a memory, a processing circuit, a logic circuit, a look-up table, etc., which may perform various functions under control of one or more microprocessors or other control devices. The components of the disclosure may be implemented by software programming or software components. Similarly to this, the embodiments may include various algorithms implemented by a combination of data structures, processes, routines, or other programming components and may be implemented by programming or scripting languages, such as C, C++, Java, assembler, and the like. Functions aspects may be implemented by an algorithm executed by one or more processors.

Also, the embodiments may implement the related art for electronic environment settings, signal processing, and/or data processing. The terms, such as "mechanism," "element," "unit," etc., may be broadly used and are not limited to mechanical and physical components. The terms may denote a series of software routines in connection with a processor, etc.

Specific executions are described in the embodiments as examples, and the range of the embodiments is not limited by particular methods. For brevity of the disclosure, other functional aspects of electronic components, control systems, software, and the systems according to the related art may not be described.

While the embodiments have been described in detail, it will be understood by one of ordinary skill in the art that various changes in form and details may be made therein without departing from the spirit and scope of the disclosure as defined by the following claims. Therefore, the embodiments described above should be interpreted as examples and not limitative in all aspects. For example, each of components described as a single unit may be executed in a distributed fashion, and likewise, components described as being distributed may be executed in a combined fashion.

The use of all examples or example terms (e.g., etc.) in the embodiments is for the purpose of describing the embodiments in detail and is not intended to limit the scope of the embodiments, when the scope of the embodiments is not limited by the claims.

Also, unless components are specifically stated by using expressions, such as "essential," "important," etc., they may not be necessary components for application of the disclosure.

It will be understood by one of ordinary skill in the art that the embodiments may be realized in modified forms without departing from the spirit and scope of the disclosure.

As the disclosure allows for various changes and numerous embodiments, the disclosure is not limited to particular embodiments, and it is to be appreciated that all changes, equivalents, and substitutes that do not depart from the spirit and technical scope of the disclosure are encompassed in the disclosure. Therefore, the embodiments described herein should be understood as examples in all aspects and should not be construed as limitations.

The scope of the disclosure is defined by the appended claims, rather than the detailed description above, and it will be understood that all of the modified or changed forms derived from the meaning and the scope of the claims and the equivalents thereof are encompassed within the range of the disclosure.

The terms described in the disclosure, such as "unit," "module," etc., denote a unit processing at least one function or operation, which may be implemented as hardware or software or a combination thereof.

A "unit" and a "module" may be stored in a storage medium that is to be addressed and may be implemented as a program executable by a processor.

For example, the "unit" and the "module" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables.

In this disclosure, the description that "A may include one of a1, a2, and a3" may broadly denote that an example which may be included in an element A includes a1, a2, or a3.

The description should not be construed as limited to the meaning that examples which may be included in the element A are necessarily limited to a1, a2, and a3. Thus, it should not be interpreted as excluding other elements than a1, a2, and a3, as examples included in the element A.

Also, the disclosure denotes that the element A may include a1, a2, or a3. The disclosure does not denote that the elements included in the element A are necessarily selected from a certain set of elements. That is, the description should not be restrictively understood as denoting that a1, a2, or a3 necessarily selected from the set including a1, a2, and a3 are included in the element A.

Also, in this disclosure, the description "at least one of a1, a2, and a3" denotes one of "a1," "a2," "a3," "a1 and a2," "a1 and a3," "a2 and a3," and "a1, a2, and a3." Thus, it should be noted that unless explicitly described as "at least one of a1, at least one of a2, and at least one of a3," the description "at least one of a1, a2, and/or a3" is not interpreted as "at least one of a1," "at least one of a2," and "at least one of a3."

What is claimed is:

1. An electronic device comprising:
   a communication interface;
   a memory storing one or more instructions; and
   a processor configured to execute the one or more instructions stored in the memory to:
      obtain a plurality of images of a real world scene, through the communication interface, the plurality of images including a first image captured by a first camera or image sensor, and a second image captured by a second camera or image sensor;
      determine whether a first object included in the first image and a second object included in the second image are a same object, wherein the first object and the second object are determined to be the same object based on a similarity between the first object and the second object and based on a first piece of capturing time and location information and a second piece of capturing time and location information respectively corresponding to the first image and the second image corresponding to a same location at a same time point, and wherein the first piece of capturing time and location information and the second piece of capturing time and location information include information about a time point and information about a location at which the first image and the second image is captured, respectively; and
      based on determining that the first object and the second object are the same object, modify and refine a neural network data recognition model to recognize the first object and the second object as the same object in both the first image and the second image by using the first image and the second image as training data of the neural network data recognition model.

2. The electronic device of claim 1, wherein the processor is further configured to execute the one or more instructions to, based on determining that the first object and the second object are not the same object, exclude the first image or the second image from the training data based on a recognition rate of the first image or the second image being less than a predefined threshold recognition rate, and modify and refine the neural network data recognition model to recognize the object based on the training data.

3. The electronic device of claim 1, wherein the processor is further configured to execute the one or more instructions to, obtain the first piece of capturing time and location information and the second piece of capturing time and location information respectively corresponding to the first image and the second image, through the communication interface.

4. The electronic device of claim 1, wherein the processor is further configured to execute the one or more instructions to:
   determine the similarity between the first object and the second object by:
   calculating a similarity value by matching the first object with the second object, and
   determining that the first object and the second object are the same object, when the similarity value is determined to be equal to or higher than a pre-set threshold value, and the first image and the second image are located in a same location at a same time point.

5. The electronic device of claim 1, wherein the processor is further configured to execute the one or more instructions to:
   recognize an object from the plurality of images by using the neural network data recognition model;
   select an image, for which a recognition rate of the object is calculated to be equal to or lower than a pre-set threshold value, from among the plurality of images; and
   determine whether to use the selected image as the training data of the neural network data recognition model.

6. The electronic device of claim 1, wherein the processor is further configured to execute the one or more instructions to:
   receive information about a recognition rate at which an object is recognized in each of the plurality of images using the neural network data recognition model, from a plurality of vehicles, through the communication interface;
   select an image, for which the recognition rate is calculated to be equal to or lower than a pre-set threshold value, from among the plurality of images, and
   determine whether or not to use the selected image as the training data of the neural network data recognition model.

7. The electronic device of claim 1, wherein the processor is further configured to execute the one or more instructions to transmit the modified and refined neural network data recognition model to a plurality of vehicles through the communication interface, the plurality of vehicles including a first vehicle in which the first camera or image sensor is mounted, and a second vehicle in which the second camera or image sensor is mounted.

8. A method comprising:
   obtaining a plurality of images of a real world scene, through a communication interface, the plurality of images including a first image captured by a first camera or image sensor, and a second image captured by a second camera or image sensor;
   determining whether or not a first object and a second object respectively included in the first image and the second image are a same object, wherein the first object and the second object are determined to be the same object based on a similarity between the first object and the second object and based on a first piece of capturing time and location information and a second piece of capturing time and location information respectively corresponding to the first image and the second image corresponding to a same location at a same time point, wherein the first piece of capturing time and location information and the second piece of capturing time and location information include information about a time point and information about a location at which the first image and the second image is captured, respectively; and
   based on determining that the first object and the second object are the same object, modifying and refining a neural network data recognition model to recognize the first object and the second object as the same object in both the first image and the second image by using the first image and the second image as training data of the neural network data recognition model.

9. The method of claim 8, further comprising:
   based on determining that the first object and the second object are not the same object, excluding the first image or the second image from the training data based on a recognition rate of the first image or the second image being less than a predefined threshold recognition rate, and modifying and refining the neural network data recognition model to recognize the object in based on the training data.

10. The method of claim 8, further comprising:
    obtaining the first piece of capturing time and location information and the second piece of capturing time and location information respectively corresponding to the first image and the second image, through the communication interface.

11. The method of claim 8, wherein the determining of the similarity between the first object and the second object comprises:
    calculating a similarity value by matching the first object with the second object; and
    determining that the first object and the second object are the same object, when the similarity is determined to be equal to or higher than a pre-set threshold value and the first image and the second image are located in a same location at a same time point.

12. The method of claim 8, further comprising:
    recognizing an object from the plurality of images by using the neural network data recognition model;
    selecting an image, for which a recognition rate of the object is calculated to be equal to or lower than a pre-set threshold value, from among the plurality of images; and
    determining whether or not to use the selected image as the training data of the neural network data recognition model.

13. The method of claim 8, further comprising:
    receiving information about a recognition rate at which an object is recognized from each of the plurality of images using the neural network data recognition model, from a plurality of vehicles, through the communication interface;
    selecting an image, for which the recognition rate is calculated to be equal to or lower than a pre-set threshold value, from among the plurality of images; and
    determining whether or not to use the selected image as the training data of the neural network data recognition model.

14. The method of claim 8, further comprising transmitting the modified and refined neural network data recognition model to a plurality of vehicles through the communication interface, the plurality of vehicles including a first vehicle in which the first camera or image sensor is mounted, and a second vehicle in which the second camera or image sensor is mounted.

15. A non-transitory computer-readable recording medium having recorded thereon a program for executing the method of claim 8, on a computer.

16. A computer-implemented method of training a neural network for object detection comprising:
   collecting a set of digital sample images from a database;
   inputting the collected set of digital sample images into a neural network recognition model; and
   modifying and refining the neural network recognition model to recognize a first object in a first digital image as a specific object based on the first object being similar to a second object in a second digital image that is co-located with the first object at a same time point.

17. The computer-implemented method of claim 16, further comprising:
   detecting objects in the collected set of digital sample images, and analyzing the detected objects; and
   determining that the first object and the second object are similar to each other when one or more appearance attributes of the first object in the first digital image match one or more appearance attributes of the second object in the second digital image.

18. The computer-implemented method of claim 16, wherein the first digital image has a first recognition rate for the specific object using the neural network recognition model that is lower than a predefined recognition rate threshold for the specific object using the neural network recognition model, and the second digital image has a second recognition rate for the specific object using the neural network recognition model that is greater than the predefined recognition rate threshold.

* * * * *